United States Patent
Kotsianti et al.

(10) Patent No.: US 7,483,554 B2
(45) Date of Patent: Jan. 27, 2009

(54) PATHOLOGICAL TISSUE MAPPING

(75) Inventors: Angeliki Kotsianti, New York, NY (US); Olivier Saidi, Greenwich, CT (US); Mikhail Teverovskiy, Harrison, NY (US)

(73) Assignee: Aureon Laboratories, Inc., Yonkers, NY (US)

(*) Notice: Subject to any disclaimer, the term of this patent is extended or adjusted under 35 U.S.C. 154(b) by 640 days.

(21) Appl. No.: 10/991,897

(22) Filed: Nov. 17, 2004

(65) Prior Publication Data
US 2005/0165290 A1    Jul. 28, 2005

Related U.S. Application Data

(60) Provisional application No. 60/520,815, filed on Nov. 17, 2003.

(51) Int. Cl.
*G06K 9/00* (2006.01)
*C12N 15/07* (2006.01)

(52) U.S. Cl. .............. 382/128; 382/224; 435/451

(58) Field of Classification Search .......... 382/100, 382/128, 129, 130, 131–133, 155, 162, 168, 382/177, 180, 181, 190–195, 203, 219, 224, 382/232, 260, 274, 276, 305, 134; 707/6; 706/12; 250/458.1; 435/7.23, 7.24, 42, 451
See application file for complete search history.

(56) References Cited

U.S. PATENT DOCUMENTS

| | | | |
|---|---|---|---|
| 4,097,845 A | * | 6/1978 | Bacus .................. 382/134 |
| 5,016,283 A | | 5/1991 | Bacus et al. |
| 5,526,258 A | * | 6/1996 | Bacus .................. 382/129 |
| 5,701,369 A | | 12/1997 | Moon et al. |
| 5,769,074 A | | 6/1998 | Barnhill et al. |
| 6,025,128 A | | 2/2000 | Veltri et al. |
| 6,059,724 A | | 5/2000 | Campell et al. |
| 6,063,026 A | | 5/2000 | Schauss et al. |
| 6,137,899 A | | 10/2000 | Lee et al. |
| 6,317,731 B1 | | 11/2001 | Luciano |
| 6,409,664 B1 | | 6/2002 | Kattan et al. |
| 6,410,043 B1 | | 6/2002 | Steiner et al. |

(Continued)

FOREIGN PATENT DOCUMENTS

WO    WO 96/09594    3/1996

OTHER PUBLICATIONS

Berry DA, Cirrincione C, Henderson IC, et al. Estrogen-receptor status and outcomes of modern chemotherapy for patients with node-positive breast cancer. *Jama* 2006;295:1658-6714.

(Continued)

*Primary Examiner*—Seyed Azarian
(74) *Attorney, Agent, or Firm*—Mintz, Levin, Cohn, Ferris, Glovsky & Popeo, P.C.

(57) ABSTRACT

Embodiments of the present invention are directed to quantitative analysis of tissues enabling the measurement of objects and parameters of objects found in images of tissues including perimeter, area, and other metrics of such objects. Measurement results may be input into a relational database where they can be statistically analyzed and compared across studies. The measurement results may be used to create a pathological tissue map of a tissue image, to allow a pathologist to determine a pathological condition of the imaged tissue more quickly.

77 Claims, 19 Drawing Sheets

U.S. PATENT DOCUMENTS

| | | | |
|---|---|---|---|
| 6,413,533 B1 | 7/2002 | Steiner et al. | |
| 6,413,535 B1 | 7/2002 | Steiner et al. | |
| 6,427,141 B1 | 7/2002 | Barnhill | |
| 6,472,415 B1 | 10/2002 | Sovak et al. | |
| 6,534,266 B1 | 3/2003 | Singer | |
| 6,545,034 B1 | 4/2003 | Carson et al. | |
| 6,545,139 B1 | 4/2003 | Thompson et al. | |
| 6,611,833 B1 * | 8/2003 | Johnson | 707/6 |
| 6,658,395 B1 | 12/2003 | Barnhill | |
| 6,789,069 B1 | 9/2004 | Barnhill et al. | |
| 6,821,767 B1 | 11/2004 | French et al. | |
| 6,828,429 B1 | 12/2004 | Srivastava et al. | |
| 6,906,320 B2 | 6/2005 | Sachs et al. | |
| 6,944,602 B2 * | 9/2005 | Cristianini | 706/12 |
| 6,949,342 B2 | 9/2005 | Golub et al. | |
| 7,052,908 B2 | 5/2006 | Chang | |
| 7,071,303 B2 | 7/2006 | Lin | |
| 7,105,560 B1 | 9/2006 | Carson et al. | |
| 7,105,561 B2 | 9/2006 | Carson et al. | |
| 7,129,262 B2 | 10/2006 | Carson et al. | |
| 7,151,100 B1 | 12/2006 | Carson et al. | |
| 7,189,752 B2 | 3/2007 | Carson et al. | |
| 7,211,599 B2 | 5/2007 | Carson et al. | |
| 7,229,774 B2 | 6/2007 | Chinnaiyan et al. | |
| 7,245,748 B2 | 7/2007 | Degani et al. | |
| 7,309,867 B2 * | 12/2007 | Costa et al. | 250/458.1 |
| 7,321,881 B2 | 1/2008 | Saidi et al. | |
| 7,332,290 B2 | 2/2008 | Rubin et al. | |
| 7,361,680 B2 | 4/2008 | Carson et al. | |
| 7,393,921 B2 | 7/2008 | Lin | |
| 2001/0036631 A1 | 11/2001 | McGrath et al. | |
| 2002/0086347 A1 | 7/2002 | Johnson et al. | |
| 2002/0165837 A1 | 11/2002 | Zhang et al. | |
| 2002/0196964 A1 | 12/2002 | Stone et al. | |
| 2003/0048931 A1 | 3/2003 | Johnson et al. | |
| 2003/0172043 A1 | 9/2003 | Guyon et al. | |
| 2003/0235816 A1 | 12/2003 | Slawin et al. | |
| 2004/0157255 A1 | 8/2004 | Agus et al. | |
| 2005/0071300 A1 | 3/2005 | Bartlett et al. | |

OTHER PUBLICATIONS

Camp, R., G. G. Chung, and D. L. Rimm, "Automated subcellular localization and quantification of protein expression in tissue microarrays," Nature Medicine, vol. 8, pp. 1323-1327, 2002.

Chen CD, Welsbie DS, Tran C, et al. Molecular determinants of resistance to antiandrogen therapy. Nat Med 2004; 10:33-91.

Cooperberg MR, Broering JM, Litwin MS, et al. The contemporary management of prostate cancer in the United States: lessons from the cancer of the prostate strategic urologic research endeavor (CapSURE), a national disease registry. J Urol 2004;171:1393-4014.

Dhanasekaran, S.M., Barrette, T.R., Ghosh, D., Shah, R., Varambally, S., Kurachi, K., Pienta, K.J., Rubin, M.A., and Chinnaiyan, A.M. 2001. Delineation of prognostic biomarkers in prostate cancer. Nature 412:822-826.

Eskelinen, M., Lipponen, P., Majapuro, R., and Syrjanen, K. 1991. Prognostic factors in prostatic adenocarcinoma assessed by means of quantitative histology. Eur Urol 19:274-278.

Freedland, S.J., Humphreys, E.B., Mangold, L.A., Eisenberger, M., Dorey, F.J., Walsh, P.C., and Partin, A.W. 2005. Risk of prostate cancer-specific mortality following biochemical recurrence after radical prostatectomy. Jama 294:433-439.

Freiha, F.S., McNeal, J.E., and Stamey, T.A. 1988. Selection criteria for radical prostatectomy based on morphometric studies in prostate carcinoma. NCI Monogr: 107-108.

Gordon, A., A. Colman-Lerner, T. E. Chin, K. R. Benjamin, R. C. Yu, and R. Brent, "Single-cell quantification of molecules and rates using open-source microscope-based cytometry," Nature Methods, vol. 4, pp. 175-181, 2007.

Hameed O, Humphrey PA. Immunohistochemistry in diagnostic surgical pathology of the prostate. Semin Diagn Pathol 2005;22:88-1041.

Harashima K, Akimoto T, Nonaka T, Tsuzuki K, Mitsuhashi N, Nakano T. Heat shock protein 90 (Hsp90) chaperone complex inhibitor, radicicol, potentiated radiation-induced cell killing in a hormone-sensitive prostate cancer cell line through degradation of the androgen receptor. Int J Radiat Biol 2005;81:63-761.

Huggins C, Hodges CV. Studies on prostate cancer: I: The effect of castration, of estrogen and of androgen injection on serum phosphatases in metastatic carcinoma of the prostate. The Journal of Urology, vol. 168, pp. 9-12, Jul. 2002.

Hull, GW, Rabbani F, Abbas F, Wheeler TM, Kattan MW, Scardino PT. Cancer control with radical prostatectomy alone in 1,000 consecutive patients. J Urol 2002;167:528-342 Pt 1.

Hurwitz, M.D., DeWeese, T.L., Zinreich, E.S., Epstein, J.I., and Partin, A.W. 1999. Nuclear morphometry predicts disease-free interval for clinically localized adenocarcinoma of the prostate treated with definitive radiation therapy. Int J Cancer 84:594-597.

Ideker, T., Galitski, T., and Hood, L. 2001. A new approach to decoding life: systems biology. Annu Rev Genomics Hum Genet 2:343-372.(2001).

Inoue, T., Segawa, T., Shiraishi, T., Yoshida, T., Toda, Y., Yamada, T., Kinukawa, N., Kinoshita, H., Kamoto, T., and Ogawa, O. 2005. Androgen receptor, Ki67, and p53 expression in radical prostatectomy specimens predict treatment failure in Japanese population. Urology 66:332-337.

Johansson JE, Andren O, Andersson SO, et al. Natural history of early, localized prostate cancer. Jama 2004; 291:2713-2719.

Krtolica, A., C. O. de Solorzano, S. Lockett and J. Campisi, "Quantification of epithelial cells in coculture with fibroblast by fluorescence image analysis," Cytometry, vol. 49, pp. 73-82, 2002.

LaTulippe, E., Satagopan, J., Smith, A., Scher, H., Scardino, P., Reuter, V., and Gerald, W.L. 2002. Comprehensive gene expression analysis of prostate cancer reveals distinct transcriptional programs associated with metastatic disease. Cancer Res 62:4499-4506.

Li H, Luan Y. Kernel Cox regression models for linking gene expression profiles to censored survival data. Pac Symp Biocomput 2003:65-76.

Li, R., Wheeler, T., Dai, H., Frolov, A., Thompson, T., and Ayala, G. 2004. High level of androgen receptor is associated with aggressive clinicopathologic features and decreased biochemical recurrence-free survival in prostate: cancer patients treated with radical prostatectomy. Am J Surg Pathol 28:928-934 (2004).

Lin Y, Kokontis J, Tang F, et al. Androgen and its receptor promote Bax-mediated apoptosis. Mol Cell Biol 2006;26:1908-165.

Luo, J., Duggan, D.J., Chen, Y., Sauvageot, J., Ewing, C.M., Bittner, M.L., Trent, J.M., and Isaacs, W.B. 2001. Human prostate cancer and benign prostatic hyperplasia: molecular dissection by gene expression profiling. Cancer Res 61:4683-4688 (2001).

Luo, J.H., Yu, Y.P., Cieply, K., Lin, F., Deflavia, P., Dhir, R., Finkelstein, S., Michalopoulos, G., and Becich, M. 2002. Gene expression analysis of prostate cancers. Mol Carcinog 33:25-35 (2002).

Messing EM, Manola J, Sarosdy M, Wilding G, Crawford ED, Trump D. Immediate hormonal therapy compared with observation after radical prostatectomy and pelvic lymphadenectomy in men with node-positive prostate cancer. N Engl J Med 341:1781-824 (1999).

Messing EM, Thompson I, Jr. Follow-up of conservatively managed prostate cancer: watchful waiting and primary hormonal therapy. Urol Clin North Am 30:687-702, viii4 (2003).

Molinaro, A. et al., Tree-based Multivariate Regression and Density Estimation with Right-Censored Data. University of California, U.C. Berkeley Division of Biostatistics Working Paper Series, 2003, 1-50.

Moul JW, Wu H, Sun L, et al. Early versus delayed hormonal therapy for prostate specific antigen only recurrence of prostate cancer after radical prostatectomy. J Urol 171:1141-73 (2004).

Ramaswamy, S., Ross, K.N., Lander, E.S., and Golub, T.R. 2003. A molecular signature of metastasis in primary solid tumors. Nat Genet 33:49-54 (2003).

Rakotomamonjy, A., Variable Selection Using SVM-based Criteria, J of Machine Learning Research, 2003; (3)1357-1370.

Rao, J.Y., D. Seligson, and G. P. Hemstreet, Protein expression analysis using quantitative fluorescence image analysis on tissue microarray slides, BioTechniques, vol. 32:924-932 (2002).

Rhodes, D.R., Barrett, T.R., Rubin, M.A., Ghosh, D., and Chinnaiyan, A.M. 2002. Meta-analysis of microarrays: intersutdy validation of gene expression profiles reveals pathway dysregulation in prostate cancer. Cancer Res 62:4427-4433 (2002).

Rubin MA, Bismar TA, Andren O, Mucci L, Kim R, Shen R, Ghosh D, Wei J, Chinnaiyan A, Adami O, Kantoff P, Johansson J-E. Decreased a-methylacyl CoA racemase expression in localized prostate cancer is associated with an increased rate of biochemical recurrence and cancer-specific death. Cancer Epid Bio Prev 2005;14:1424-1432.

Sadi MV, Barrack ER. Androgen receptors and growth fraction in metastatic prostate cancer as predictors of time to tumor progression after hormonal therapy. Cancer Surv 11:195-215 (1991).

Sadi MV, Barrack ER. Image analysis of androgen receptor immunostaining in metastatic prostate cancer. Heterogeneity as a predictor of response to hormonal therapy. Cancer 71:2574-2580 (1993).

Sharifi N, Gulley JL, Dahut WL. Androgen deprivation therapy of prostate cancer. Jama 2005;294:238-442.

Singh, D., Febbo, P.G., Ross, K., Jackson, D.G., Manola, J., Ladd, C., Tamayo, P., Renshaw, A.A., D'Amico, A.V., Richie, J.P., et al. 2002. Gene expression correlates of clinical prostate cancer behavior. Cancer Cell 1:203-209.

Smola, A. et al., A Turtorial on Support Vector Regression, NeuroCOLT2 Technical Report Series NCE-TR-1998-030, 1998, 1-73.

Stephenson AJ, Scardino PT, Eastham JA, et al. Postoperative nomogram predicting the 10-year probability of prostate cancer recurrence after radical prostatectomy. J Clin Oncol, 23:;7005-12 (2005).

Stephenson AJ, Smith A, Kattan MW, et al. Integration of gene expression profiling and clinical variables to predict prostate carcinoma recurrence after radical prostatectomy. Cancer 104:290-298 (2005).

Stephenson AJ, Scardino PT, Eastham JA, Bianco F, Dotan ZA, Fearn PA, Kattan M. Preoperative nomogram predicting the 10-year probability of prostate cancer recurrence after radical prostatectomy. J Natl Cancer Inst 2006 98:715-717.

Su, A.I., Welsh, J.B., Sapinoso, L.M., Kern, S.G., Dimitrov, P., Lapp, H., Schultz, P.G., Powell, S.M., Moskaluk, C.A., Frierson, H.F., Jr., et al. 2001. Molecular classification of human carcinomas by use of gene expression signatures. Cancer Res 61:7388-7393.

Sun L, Gancarczyk K, Paquette E, et al. Introduction to Department of Defense Center for Prostate Disease Research Multicenter National Prostate Cancer Database, and analysis of changes in the PSA-era. Urol Oncol 2001;6:203-95.

Swindle P.W., et al., Markers and Meaning of Primary Treatment Failure. Urologic Clinics of North America. 30(2):377-401, May 2003.

Swindle, P., Eastham, J.A., Ohori, M., Kattan, M.W., Wheeler, T., Maru, N., Slawin, K., and Scardino, P.T. 2005. Do margins matter? The prognostic significance of positive surgical margins in radical prostatectomy specimens. J Urol 174:903-907(2005).

Vonesch, C., F. Aquet, J.L. Vonesch and M. Unser, "The colored revolution of bioimaging," IEEE Signal Proc. Mag., vol. 23, No. 3, pp. 20-31, May 2006.

Ward JF, Blute ML, Slezak J, Bergstralh EJ, Zincke H. The long-term clinical impact of biochemical recurrence of prostate cancer 5 or more years after radical prostatectomy. J Urol 2003; 170:1872-65.

Welsh, J.B., Sapinoso, L.M., Su, A.I., Kern, S.G., Wang-Rodriguez, J., Moskaluk, C.A., Frierson, H.F., Jr., and Hampton, G.M. 2001. Analysis of gene expression identifies candidate markers and pharmacological targets in prostate cancer. Cancer Res 61:5974-5978 (2001).

Wirth M, Tyrrell C, Delaere K, et al. Bicalutamide ('Casodex') 150 mg in addition to standard care in patients with nonmetastatic prostate cancer: updated results from a randomised double-blind phase III study (median follow-up 5.1 y) in the early prostate cancer programme. Prostate Cancer Prostatic Dis (2005);8:194-200.

Ye, Q.H., Qin, L.X., Forgues, M., He, P., Kim, J.W., Peng, A.C., Simon, R., Li, Y., Robles, A.I., Chen, Y., et al. 2003. Predicting hepatitis B virus-positive metastatic hepatocellular carcinomas using gene expression profiling and supervised machine learning. Nat Med 9:416-423.

Yeang, C.H., Ramaswamy, S., Tamayo, P., Mukherjee, S., Rifkin, R.M., Angelo, M., Reich, M., Lander, E., Mesirov, J., and Golub, T. 2001. Molecular classification of multiple tumor types. Bioinformatics 17 Suppl 1:S316-322.

Office Action corresponding to U.S. Appl. No. 10/991,240, mailed May 28, 2008, 22 pgs.

International Search Report for PCT/US04/38778, Mailed Jul. 2, 2008, 1 pg.

Aaltomaa S, Karja V, Lipponen P, et al. Expression of Ki-67, cyclin D1 and apoptosis markers correlated with survival in prostate cancer patients treated by radical prostatectomy. Anticancer Res. 2006;26(6C):4873-4878.

Albertsen PC, Hanley JA, Fine J. 20-year outcomes following conservative management of clinically localized prostate cancer. Jama. 2005;293(17):2095-2101.

Bertrand PV, Holder RL. A quirk in multiple regression: the whole regression can be greater than the sum of its parts. Statistician. 1988;37(4/5):371-374.

Bettencourt MC, Bauer JJ, Sesterhenn IA, Mostofi FK, McLeod DG, Moul JW. Ki-67 expression is a prognostic marker of prostate cancer recurrence after radical prostatectomy. J Urol. 1996;156(3):1064-1068.

Bill-Axelson A, Homberg L, Ruutu M, et al. Radical prostatectomy versus watchful waiting in early prostate cancer. N Engl J Med. 2005;352(19):1977-1984.

Bubendorf L, Tapia C, Gasser TC, et al. Ki67 labeling index in core needle biopsies independently predicts tumor-specific survival in prostate cancer. Hum Pathol. 1998;29(9):949-954.

Churilov, L., et al., Improving risk grouping rules for prostate cancer patients with optimization, System Sciences, 2004. Proceedings of the 37th Annual Hawaii International Conference, pp. 1-9. Digital Object Identifier 10. 1109/HICSS.2004.1265355.

Coleman K, van Diest PJ, Baak JP, Mullaney J. Syntactic structure analysis in uveal melanomas. Br J Ophthalmol. 1994;78(11):871-874.

Cox, R., "Regression models and life tables (with discussion)," Journal of the Royal Statistical Society, Series B, vol. 34, pp. 187-220, 1972.

Cuzick J, Fisher G, Kattan MW, et al. Long-term outcome among men with conservatively treated localised prostate cancer. Br J Cancer. 2006;95(9):1186-1194.

de la Taille A, Katz AE, Bagiella E, et al. Microvessel density as a predictor of PSA recurrence after radical prostatectomy. A comparison of CD34 and CD31. Am J Clin Pathol. 2000;113(4):555-562.

Gonzalgo ML, Bastian PJ, Mangold LA, et al. Relationship between primary Gleason pattern on needle biopsy and clinicopathologic outcomes among men with Gleason score 7 adenocarcinoma of the prostate. Urology. 2006;67(1):115-119.

Grober ED, Tsihlias J, Jewett MA, et al. Correlation of the primary Gleason pattern on prostate needle biopsy with clinico-pathological factors in Gleason 7 tumors. Can J Urol. 2004;11(1):2157-2162.

Halvorsen OJ, Haukaas S, Hoisaeter PA, Akslen LA. Independent prognostic importance of microvessel density in clinically localized prostate cancer. Anticancer Res. 2000;20(5C):3791-3799.

Holmberg L, Bill-Axelson A, Helgesen F, et al. A randomized trial comparing radical prostatectomy with watchful waiting in early prostate cancer. N Engl J Med. 2002;347(11):781-789.

J. W. Baish and R. K. Jain, Fractals and cancer, Cancer Research, vol. 60, pp. 3683-3688, 2000.

Julious SA, Mullee MA. Confounding and Simpson's paradox. Bmj. 1994;309(6967):1480-1481.

Khatami A, Pihl CG, Norrby K, Hugosson J, Damber JE. Is tumor vascularity in prostate core biopsies a predictor of PSA recurrence after radical prostatectomy? Acta Oncol. 2005;44(4):362-368.

Kim J, Jia L, Stallcup MR, Goetzee GA. The role of protein kinase A pathway and cAMP responsive element-binding protein in androgen receptor-mediated transcription at the prostate-specific antigen locus. J Mol Endocrinol. 2005;34(1):107-118.

Klotz L. Active surveillance versus radical treatment for favorable-risk localized prostate cancer. *Curr Treat Options Oncol.* 2006;7(5):355-362.

Lee Y-J, Mangasarian OL, Wolberg WH. Breast cancer survival and chemotherapy: a support vector machine analysis. *DIMACS Series in Discrete Mathematics and Theoretical Computer Science.* 2000;55:1-10.

Mucci NR, Rubin MA, Strawderman MS, Montie JE, Smith DC, Pienta KJ. Expression of nuclear antigen Ki-67 in prostate cancer needle biopsy and radical prostatectomy specimens. *J Natl Cancer Inst.* 2000;92(23):1941-1942.

Pasquier, D, et al., MRI alone simulation for conformal radiation therapy of prostate cancer: Technical Aspects, *Engineering in Medicine and Biology Society*, 2006. EMBS 28th Annual International Conference of the IEEE, pp. 160-163.

Pollack A, DeSilvio M, Khor LY, et al. Ki-67 staining is a strong predictor of distant metastasis and mortality for men with prostate cancer treated with radiotherapy plus androgen deprivation: Radiation Therapy Oncology Group Trial 92-02. *J Clin Oncol.* 2004;22(11):2133-2140.

Pouliot, S., et al., Automatic detection of three radio-opaque markers for prostate targeting using EPID during radiation therapy, *Image Proceedings.* 2001 International Conference on vol. 2, 2001 pp. 857-860, Digital Object Identifier 10.1109/ICIP.2001.958629.

Scheipers, U., et al., Ultrasonic multifeature tissue characterization for the early detection of prostate cancer, Ultrasonics Symposium, 2001. IEEE vol. 2 pp. 1265-1268.

Singh, S., et al. Raf kinase inhibitor protein: a putative molecular target in prostate cancer, India Annual Conference, 2004. Proceedings of the IEEE INDICON. 1st, pp. 406-409.

Smaletz O, Scher HI, Small EJ, et al. Nomogram for overall survival of patients with progressive metastatic prostate cancer after castration. *J Clin Oncol.* 2002;20(19):3972-3982.

Song, Yan, et al., A model-aided segmentation in urethra identification based on an atlas human autopsy image for intesity modulated radiation therapy. *Engineering in Medicine and Biology Society*, 2007. EMBS. 29th Annual International Conference of the IEEE 22-26 pp. 3532-3535.

van Diest PJ, Fleege JC, Baak JP. Syntactic structure analysis in invasive breast cancer: analysis of reproducibility, biologic background, and prognostic value. *Hum Pathol.* 1992;23(8):876-883.

Vonesch, F. Aguet, J. L. Vonesch, and M. Unser, The colored revolution of bioimaging, *IEEE Signal Proc. Mag.*, vol. 23, No. 3, pp. 20-31, May 2006.

Weyn, B. Computer Assisted Dfferenes Computer-Assisted Differential Diagnosis of Malignant Mesothelioma Based on Syntactic Structure Analysis, *Cytometry* 35:23-29 (1999).

Ablameyko S., et al. "From cell image segmentation to differential diagnosis of thryoid cancer", Pattern Recognition, 2002. Proceedings. 16th International Conference on Quebec City, Que., Canada Aug. 11-15, 2002, Los Alamitos, CA, USA, IEEE Compout. Soc, Us, vol. 1, Aug. 11, 2002, pp. 763-766.

M. Antonini, et al., "Image coding using wavelet transform," *IEEE Trans. Image Process.*, vol. 1, pp. 205-220, 1992.

Baatz M., et al., "Multiresolution Segmentation—An Optimization Approach for High Quality Multi-scale Image Segmentation," In *Angewandte Geographische Informationsverarbeitung* XII, Strobl, J., Blaschke, T., Griesebner, G. (eds.), Wichman—Verlag, Heidelberg, pp. 12-23, 2000.

E. Biganzoli, et al. Feed forward neural networks for the analysis of censored survival data: a partial logistic regression approach. *Stat Med*, 1998.

S.F. Brown, et al. On the use of artificial neural networks for the analysis of survival data. *IEEE Trans. on Neural Networks*, 8(5):1071-1077, 1997.

H.B. Burke, et al. Artificial neural networks improve the accuracy of cancer survival prediction. *Cancer*, 97(4): pp. 857-862, 1997.

Brown, et al. Knowledge-based analysis of microarray gene expression data by using support vector machines. Proc Natl Acad Sci U S A 97:262-7, 2000.

E. Davidow, et al. Advancing drug discovery through systems biology. *Drug Discov Today*, 8:175-183, 2003.

I. Daubechies, *Ten Lectures on Wavelets*, SIAM, Philadelphia, PA, 1992, pp. 198-202 and pp. 254-256.

Definiens Cellenger Architecture: A Technical Review, Apr. 2004.

C.J. S. deSilva, et al. Artificial neural networks and breast cancer prognosis. *Australian Comput. J.* 26:78-81, 1994.

J. Diamond, et al., "The use of morphological characteristics and texture analysis in the identification of tissue composition in prostatic neoplasia," *Human Pathology*, vol. 35, pp. 1121-1131, 2004.

R.O. Duda, et al., *Pattern Classification*, 2nd ed. Wiley, New York, 2001, pp. 483-484.

Egmont-Petersen M. et al., "Image Processing with Neural Networks-a-Review", Pattern Recognition, Elsevier, Kidlington, GB, vol. 35, No. 10, Oct. 2002, pp. 2279-2301.

U.M. Fayyad, et al. Knowledge Discovery and Data Mining : Towards a unifying framework. In *Proceedings of the Second International Conference on Knowledge Discovery and Data Mining*, Portland, 1996. AAAI Press.

K. Fukunaga, *Introduction to Statistical Pattern Recognition*, 2nd ed. New York: Academic, 1990, p. 125.

Graefen M., et al. International validation of a preoperative nomogram for prostate cancer recurrence after radical prostatectomy. J. Clin Oncol 20:3206-12, 2002.

Graefn M., et al. A validation of two preoperative nomograms predicting recurrence following radical prostatectomy in a cohort of European men. Urol Oncol 7:141-6, 2002.

Graefen, M., et al. Validation study of the accuracy of a postoperative nomogram for recurrence after radical prostatectomy for localized prostate cancer. *Journal of Clin Oncol*, 20:951-956, 2002.

R.C. Gonzales, et al., *Digital Image Processing*. Addison-Wesley, New York, 1992, pp. 173-185.

H. Gronberg. Prostate cancer epidemiology, *Lancet*, 361:859-864, 2003.

Guyon I, et al. Gene selection for cancer classification using support vector machines. Machine Learning 1:S316-22, 2002.

Halabi S, et al. Prognostic model for predicting survival in men with hormone-refractory metastatic prostate cancer. J. Clin Oncol 21:1232-7, 2003.

William S. Harlan, "Optimization of a Neural Network", Feb. 1999 (5 pp.) accessed at http://billharlan.com/pub/papers/neural/ on Mar. 1, 2006.

F.E. Harrell, et al. Evaluating the yield of medical tests. *JAMA*, 247(18):2543-2546, 1982.

F.E. Harrell, Regression Modeling Strategies, Springer-Verlag 2001, pp. 247 and 493.

L. Hood. Systems biology: integrating technology, biology, and computation. *Mech Ageing Dev*, 124:9-16, 2003.

A.E. Jacquin, "Fractal image coding: A review," *Proc. IEEE*, vol. 81, pp. 1451-1465, 1993.

Kaplan E.L., et al. (1958), "nonparametric Estimation from Incomplete Observatinos," JASA, 53, pp. 457-481.

M. W. Kattan, et al. Postoperative nomogram for disease recurrence after radical prostatectomy for prostate cancer. *Journal of Clin Oncol*, 17:1499-1507, 1999.

M.W. Kattan, et al. Experiments to determine whether recursive partitioning or an artificial neural network overcomes theoretical limitation of cox proportional hazards regression. *Comput Biomed Res*, 31(5):363-373, 1998.

M.W. Kattan, et al. << A preoperative nomogram for disease recurrence following radical prostatectomy for prostate cancer. J. Natl. Cancer Inst. 90:766-771, 1998.

K. Jafari-Khouzani, et al. "Multiwavelet grading of pathological images of prostate," *IEEE Trans. Biomed. Eng.*, vol. 50, pp. 697-704, 2003.

Kim K.S. et al., "Automatic classification of cells using morphological shape in peripheral blood images", Proceedings of the SPIE—the international society for optical engineering spie-int. soc. Opt. eng USA, vol. 4210, 2000, (290-298 pp).

J.P . Klein, et al. *Survival Analysis: Techniques for Censored and Truncated Data*. Springer, New York, 1997, pp. 247-335.

G. Landini "Applications of fractal geometry in pathology," in *Fractal Geometry in Biological Systems: An Analytical Approach*, P.M. Iannaccone and M. Kohokha, Eds. CRC Press, Boca Raton, FL, 1996, pp. 205-246.

A. Laine, et al., "Texture classification by wavelet packet signatures," *IEEE Trans. Pattern Anal. Machine Intell.*, vol. 15, pp. 1186-1191, 1993.

D.C. Liu, et al. On the limited memory bfgs method for large scale optimization. *Mathematical Programming*, 45:503-528, 1989.

N. Lu, *Fractal Imaging*. Academic, San Diego, CA 1997.

L. Ohno-Machado, et al. Modular neural networks for medical prognosis: Quantifying the benefits of combining neural networks for survival prediction. *Connection Science*, 9:71-86, 1997.

Mohler JL, et al. Nuclear roundness factor measurement for assessment of prognosis of patients with prosatatic carcinoma. I. Testing of a digitization system. J. Urol 139:1080-4, 1988.

Olinici CD, et al. Computer-based image analysis of nucleoli in prostate carcinoma. Rom J. Morphol Embryol 43:163-7, 1997.

E.E. Osuna, et al. Support Vector Machines : Training and Applications. A.I. Memo 1602/C.B.C.L. Paper 144, MIT, 1997.

Partin AW, et al. Use of nuclear morphometry, Gleason histologic scoring, clinical stage, and age predict disease-free survival among patients with prostate cancer. Cancer 70:161-168, 1992.

M.A. Roula, et al., "A multispectral computer vision system for automatic grading of prostatic neoplasia," in *Proc. Proc. IEEE Int. Symp. Biomed. Imaging*, Washington, DC, 2002, pp. 193-196.

Sabino D M U et al., "Toward leukocyte recognition using morphometry, texture and color", Biomedical Imaging: Macro To Nano, 2004. IEEE International Symposium on Arlington Va, USA Apr. 15-18, 2004, Piscataway, NJ USA, IEEE, Apr. 15, 2004, pp. 121-124.

Scher HI, et al. Clinical states in prostate cancer: towards a dynamic model of disease progression. Urology 55:323-327, 2000.

Schoelkopf B. et al., "Comparing Support Vector Machines With Gaussian Kernels to Radial Basis Function Classifiers", IEEE Transactions on Signal Processing, IEEE Service Center, New York, NY, US, vol. 45, No. 11, Nov. 1997, pp. 2758-2765.

B.A.M. Schouten, et al., "Feature extraction using fractal codes," in *Proc. Int. Conf. Visual Information and Information Systems*, Amsterdam, 1999, pp. 483-492.

A. Sloan, "Retrieving database contents by image recognition: New fractal power," *Advanced Imaging*, vol. 5, pp. 26-30, 1994.

Smaletz O, et al., Nomogram for overall survival of patients with progressive metastatic prostate cancer after castration. J. Clin Oncol 20:3972-82,2002.

Y. Smith, et al., "Similarity measurement method for the classification of architecturally differentiated images," *Comp. Biomed. Res.*, vol. 32, pp. 1-12, 1999.

P. Snow, et al. Artificial neural networks in the diagnosis and prognosis of prostate cancer: a pilot study. *J. Urology*, 152(5):1923-1926, 1997.

Stephenson RA, et al. An image analysis method for assessment of prognostic risk in prostate cancer: a pilot study. Anal Cell Pathol 3:243-8, 1991.

R. Stotzka, et al., "A hybrid neural and statistical classifier system for histopathologic grading of prostate lesions," *Anal. Quant. Cytol. Histol.*, vol. 17, pp. 204-218, 1995.

M. Teverovskiy, et al., "Improved prediction of prostate cancer recurrence base on an automated tissue image analysis system," in Proc. *IEEE Int. Symp. Biomed. Imaging*, Arlington, VA, 2004, pp. 257-260.

Tong, Zhao et al., "A novel scheme for abnormal cell detection in pap smear images". Proceedings of the Spie—The International Society for Optical Engineering SPIE-INT. Soc. Opt. Eng USA, vol. 5318, No. 1, Jul. 2004, pp. 151-162.

Veltri RW, et al. Quantitative nuclear grade (QNG) : a new image analysis-based biomarker of clinically relevant nuclear structure alterations. J Cell Biochem Suppl Suppl 35:151-7, 2000.

Veltri RW, et al., Ability to predict biochemical progression using Gleason score and a computer-generated quantitative nuclear grade derived from cancer cell nuclei. Urology 48:685-91, 1996.

Veltri RW, et al. Quantitative nuclear morphometry, Markovian texture descriptors, and DNA content captured on a CAS-200 Image analysis system, combined with PCNA and HER-2/neuimmunohistochemistry for prediction of prostate cancer progression. J. Cell Biochem Suppl 19:249-58, 1994.

I. Yan, et al., "Optimizing classifier performance via an approximation function to the Wilcoxon-mann-whitney statistic," *Proc. Of 20th Int'l Conf. Machine Learning*, pp. 848-855,2003.

Yeh W-C et al., << Liver fibrosis grade classification with B-mode ultrasound >> Ultrasound in Medicine and Biology, New York, NY, US, vol. 29, No. 9 Sep. 2003, pp. 1229-1235.

Wang N., et al. Morphometry of nuclei of the normal and malignant prostate in relation to DNA ploidy. Anal Quant Cytol Histol 14:210-6, 1992.

A.W. Wetzel, et al. "Evaluation of prostate tumor grades by content-based image retrieval," in *Proc. SPIE AIPR Workshop on Advances in Computer-Assisted Recognition*, vol. 3584, Washington, DC, 1999, pp. 244-252.

International Search Report dated Jan. 20, 2006, corresponding to PCT/US2004/038536.

* cited by examiner

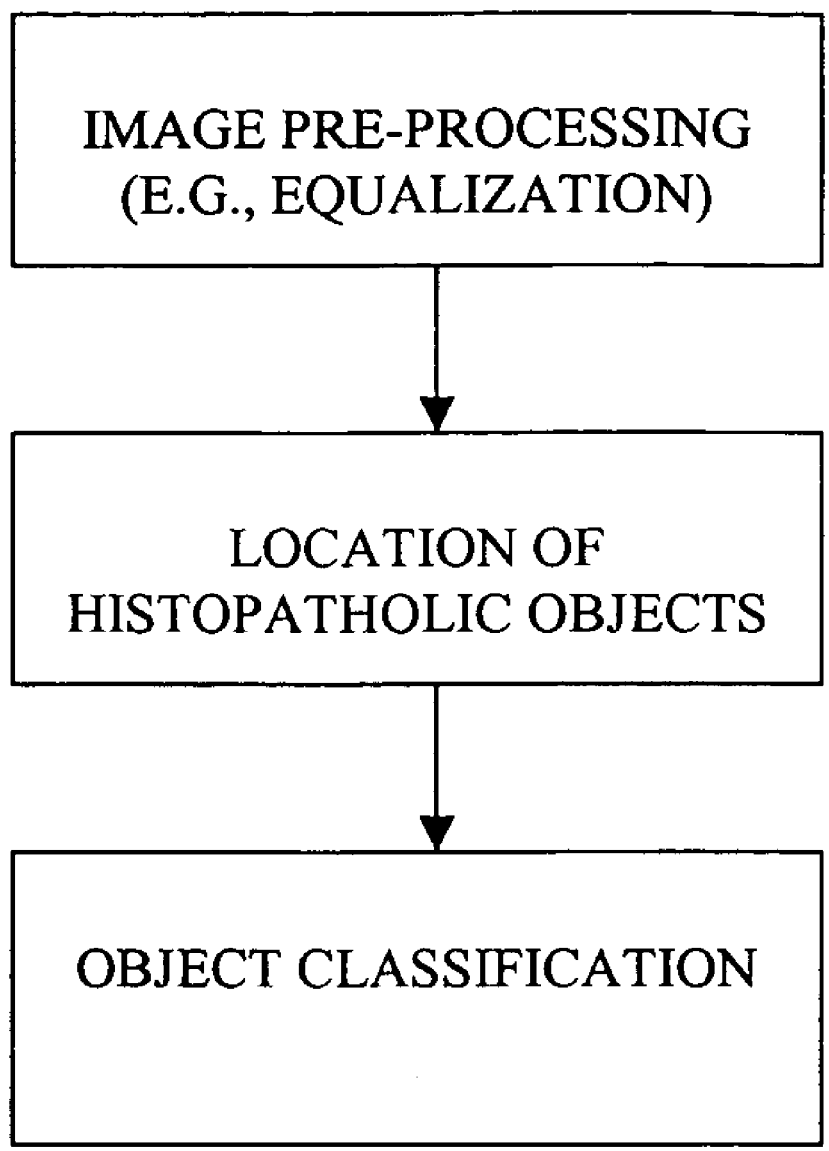

FIG. 3B (top)
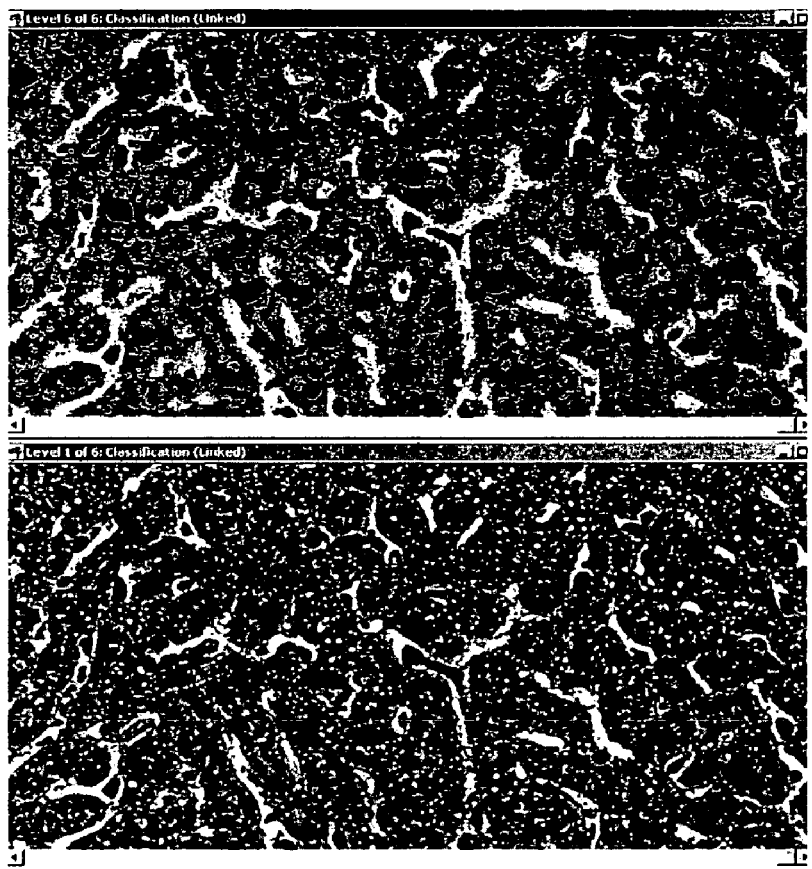
FIG. 3A (bottom)
Hepatic nuclei 
Kupffer nuclei 
Sinusoid 
Fat 

FIG. 3D (top)
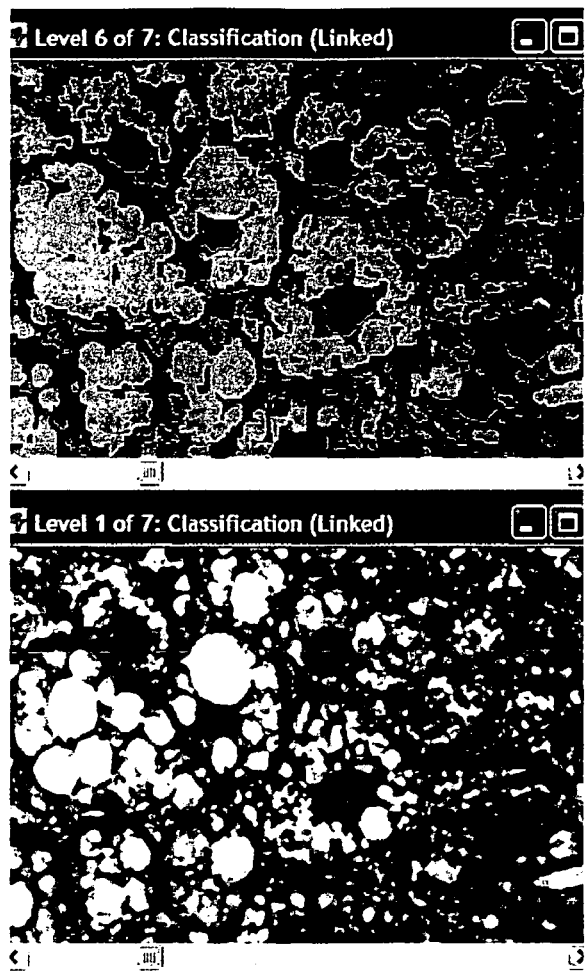
FIG. 3C (bottom)
Hepatic nuclei 
Kupffer nuclei 
Sinusoid 
Fat 

FIG. 4A (top)
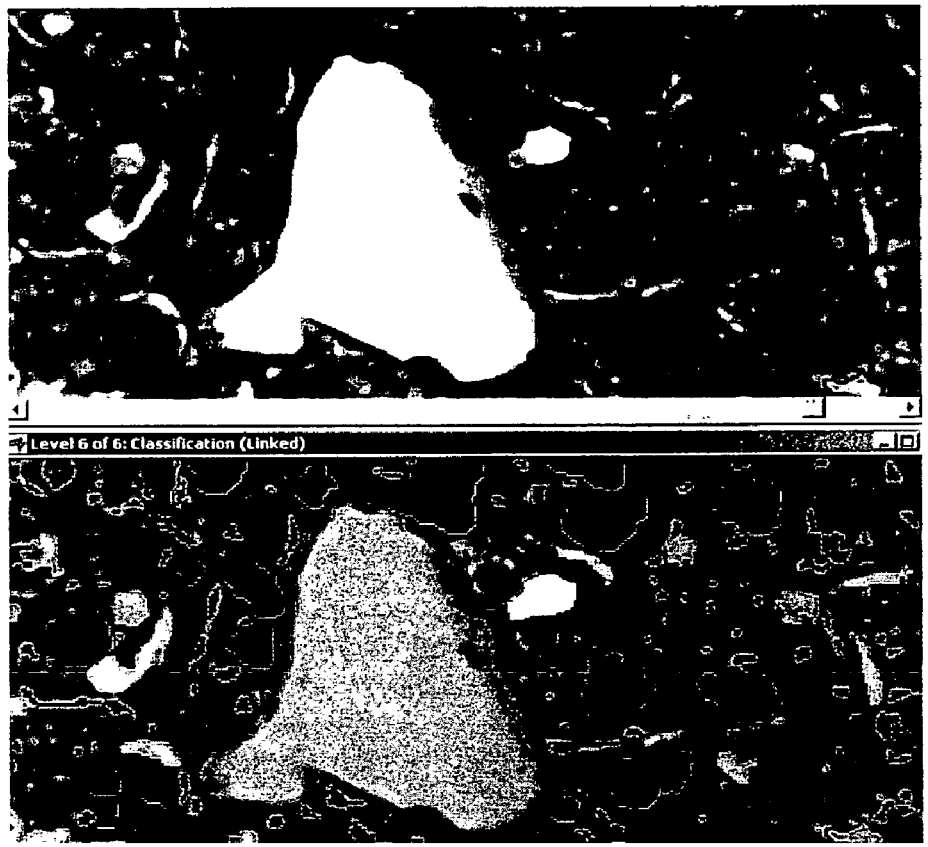
FIG. 4B (bottom)
Bile Duct Lumen
Epithelial Nuclei 
Hepatic Artery Lumen 
Hepatic nuclei 

FIG. 5B (top)
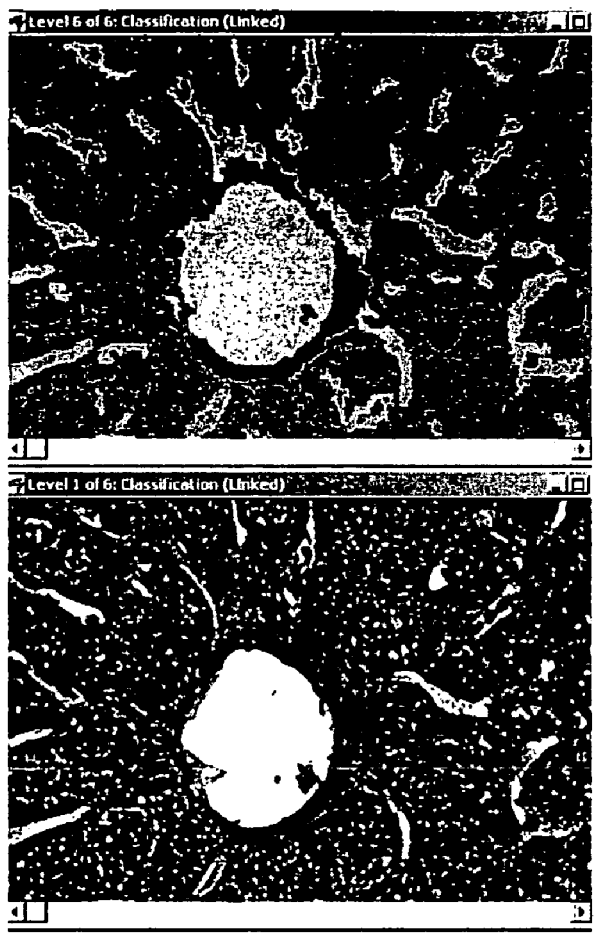
FIG. 5A (bottom)
Hepatic Vein Lumen
Hepatic Vein Wall 
Hepatic nuclei 

FIG. 6B (top)
FIG. 6A (bottom)
Hepatic Artery 
Red Blood Cells 
Hepatic nuclei 

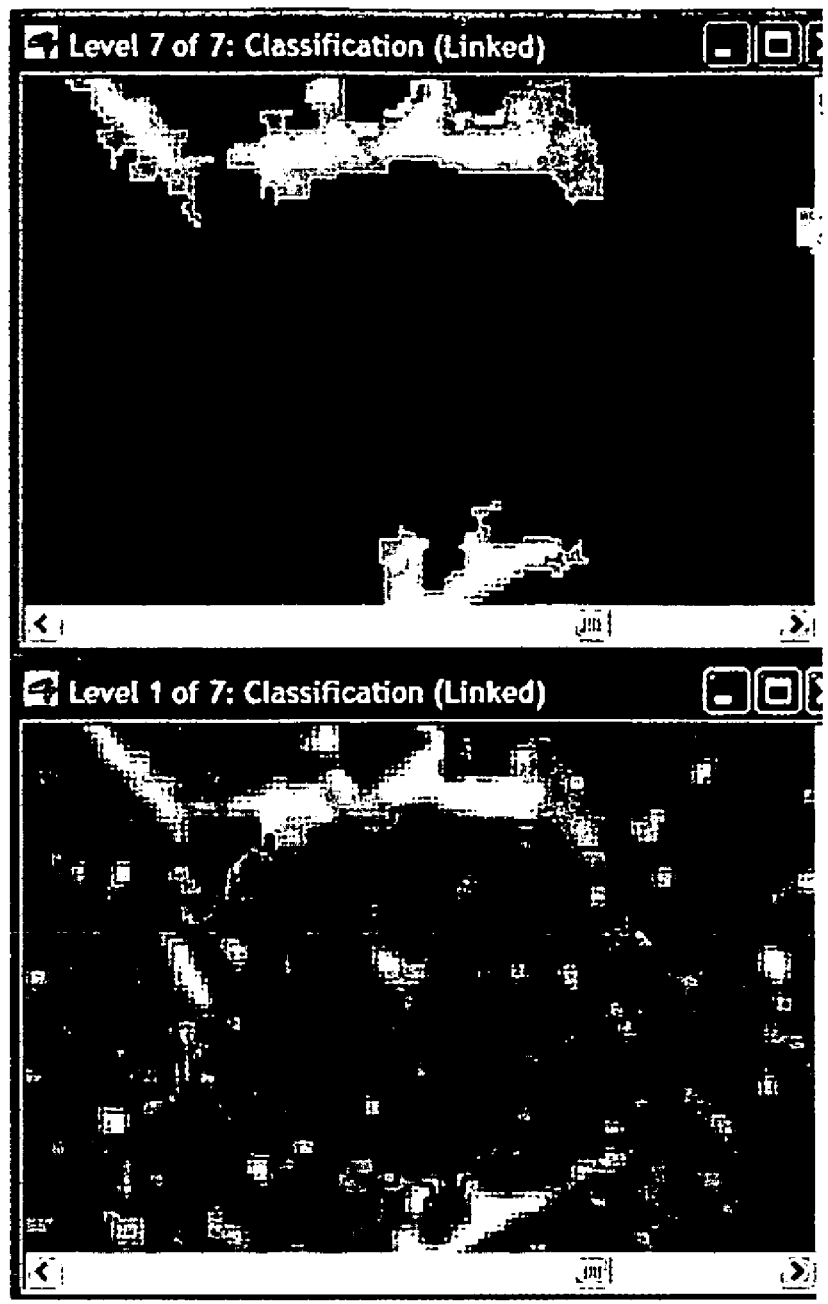
FIG. 7B (top)
FIG. 7A (bottom)

Fig. 8C
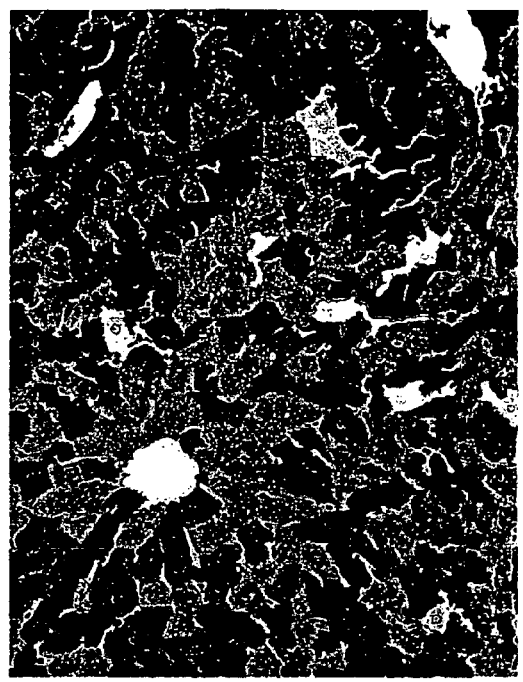
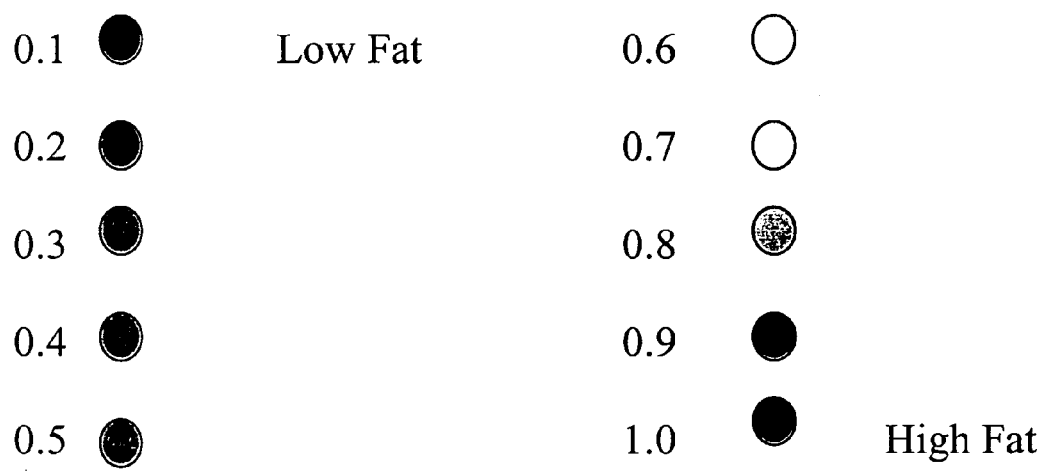

Fig. 9C
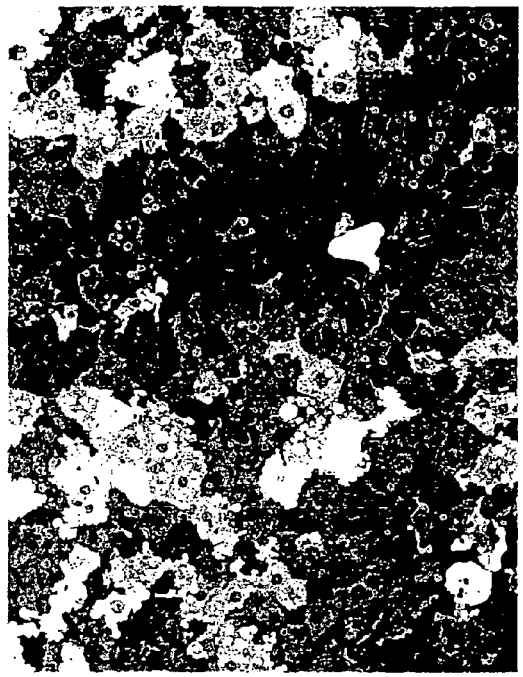
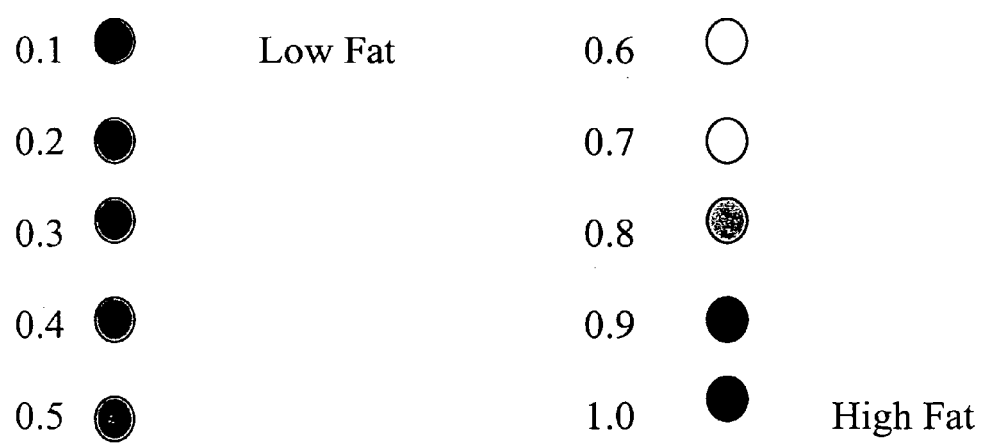

PATHOLOGICAL TISSUE MAPPING

CLAIM TO PRIORITY

This application claims priority under 35 U.S.C. §119(e) of U.S. patent application Ser. No. 60/520,815, filed Nov. 17, 2003, the entire disclosure of which is herein incorporated by reference in its entirety.

FIELD OF THE INVENTION

This invention relates to molecular biology, histology, and clinical diagnostics. Clinical, micro-anatomic and molecular profiles of disease are integrated to create a system for tissue analysis which, in a preferred embodiment, comprises a pathological mapping of a tissue image to determine a pathological status or condition of the tissue in the image. The file of this patent contains at least one figure executed in color. Copies of this patent with color figures will be provided by the Office upon request and payment of the necessary fee.

BACKGROUND OF THE INVENTION

Pathology is the medical science and specialty practice that deals with all aspects of disease, but with special reference to the essential nature, causes, and development of abnormal conditions. This generally includes analysis of the structural and functional changes that result from diseases.

To determine the causes of a disease, a pathologist may study: how various internal and external injuries affect cells and tissues, how a disease progresses (pathogenesis), and how a disease manifests in a tissue (i.e., its clinical expression and the lesions produced). In other words, pathology provides a scientific foundation for clinical medicine and serves as a bridge between the basic sciences and patient care.

Accordingly, accurate and repeatable quantitative analysis of tissue is important to characterize a disease and evaluate effects that new therapies might have. To date, little if any reliable structural information exists at the tissue level (e.g., 1-1000 microns, in the range of microscopic to mesoscopic). It is believed that if reliable, multi-dimensional structural tissue information (including, for example, clinical, molecular and genetic information) existed in readily accessible databases. Such information would enhance and accelerate new advances in tissue engineering, drug design, gene discovery, proteomics, and genomics research.

In order to facilitate the study and diagnosis of disease, investigators have developed a variety of systems and methods. Generally, prior art methods and systems relating to the study of disease are slow, difficult and prone to error. Accordingly, there exists a need for a system and/or method to quickly, efficiently, and/or automatically quantify tissue for determining a condition of a tissue.

SUMMARY OF THE INVENTION

The present invention presents methods and systems for processing and analyzing a tissue image(s), and moreover, with regard to some embodiments of the invention, for automating object/feature extraction from tissue and/or determining quantitative definition of tissue features. Embodiments of the present invention produce a pathological tissue map (PTM) of the tissue, which comprises a modified version of an image of the tissue. The PTM classifies objects of the tissue into visible indicators which may be analyzed quickly by a user (e.g., pathologist) and/or an algorithm, to more quickly determine a tissue condition (e.g., normal versus abnormal).

For example, a PTM may be generated by quantifying a variety of micro-anatomic and/or molecular data and associating a color grade with a range for that particular data. Accordingly, the data may be rendered in a format where areas of abnormality are identified in a specific color (red for example), which may be easily identifiable to a viewer (e.g., pathologists, scientists or physicians).

In one embodiment of the invention, an automated tissue processing system is disclosed, for advanced tissue image classification of (for example) hematoxylin and eosin (H&E)-stained tissue sections. Using such a system, tissue images may be segmented then analyzed. Furthermore, using neural network or support vector regression ("SVR"), the segmented images may be used to train a biostatistical model to determine tissue condition (e.g., normal versus abnormal).

In particular, such a system may facilitate distinguishing and visualizing an object in a tissue image using predetermined criteria. When an object is found, boundaries of the object may be constructed using (for example) modified object extraction algorithms used in the art.

Criteria for locating tissue objects may include, for example, object color, color intensity, object morphology (including material composition), object size and shape (e.g., dimensions, round, oval, etc.), arrangement of objects, or any combination thereof. For example, with regard to color, a tissue may be stained to highlight certain objects. To detect tissue objects in an image, existing mathematical feature detection algorithms may be used, or modified versions thereof, such as those available with the Cellenger software product marketed by Definiens A.G. Such algorithms may include, for example, dilation (adding pixels to the boundary of an object), erosion (removing pixels on the object boundaries), and thresholding. In addition, the detection of background intensity is useful for object determination and is required in some feature extraction algorithms.

One can also apply one or more morphological filters to enhance certain objects and suppress others. Such enhancements may change the shape of an object contained within an image. Morphological filters are preferably used prior to applying character/shape recognition algorithms since these filters can highlight the contour of objects which aid the recognition. For example, a morphological filter may be used to enhance certain objects of a particular size and the dilation and/or erosion algorithms may be used to bring out the enhanced objects.

Embodiments of the invention may further include quantitative determination of object geometry. One or more found objects may be quantified (e.g., measured), and a modified tissue image established with visual indicators indicating the quantified objects. The modified image represents the PTM for pathological analysis.

Still other embodiments of the present invention are directed to databases, which may be used in conjunction with other embodiments of the invention. Specifically, such databases may include characterization data and/or associated images ("tissue information") representative of a tissue population, and/or an automated method to create such database and use of the database for classification and evaluation of tissue specimens. For example, samples of normal tissue specimens obtained from a subset of a population of subjects with shared characteristics may be profiled (e.g., objects extracted and classified as normal) in order to generate a plurality of structural indices that correspond to statistically significant representations of tissue associated with the population.

The database may also include information from profiled tissue images from samples of specimens of a particular tissue obtained from a subset of a population with respect to certain structural or other indicia, that correspond to a particular clinical condition associated with that tissue. Such information may be used to provide a comparison with information obtained from additional specimens of the tissue, including specimens which may have been previously profiled by other means or for other purposes. Indicia may include at least one of cell density, matrix density, blood vessel density, layer thickness or geometry, and the like.

Embodiments of the invention may be used to identify a toxic effect or response, immunological reactions, morphological lesions caused by, for example, hepatitis (acute, subacute and chronic), cholestasis (with and without inflammation or necrosis), fibrosis, granulomatous hepatitis, steatosis (macro and microvesicular), vascular lesions, and hepatic tumors. Further yet, embodiments of the invention may be used to characterize pathological objects, for example, Kupffer cell hyperplasia, cholangitis, cholangiolitis, necrotizing angitis, sinusoidal dilatation, hepatoportal sclerosis and venous thromboses.

BRIEF DESCRIPTION OF THE DRAWINGS

FIG. 2 is a block diagram representing a process flow for image segmentation according to some embodiments of the present invention.

FIG. 3A is an original image of normal liver tissue.

FIG. 3B is a segmented image of the normal liver tissue of FIG. 3A, illustrating hepatic nuclei, kupffer nuclei, sinusoids and fat content.

FIG. 3C is an original image of abnormal liver tissue.

FIG. 3D is a segmented image of the abnormal liver tissue of FIG. 3C, illustrating hepatic nuclei, kupffer nuclei, sinusoids and fat content.

FIG. 4A is an original tissue image of a bile duct.

FIG. 4B is a segmented image of the bile duct of FIG. 4A, illustrating bile duct lumen, epithelial nuclei, hepatic artery lumen, and hepatic nuclei.

FIG. 5A is an original tissue image of a hepatic vein.

FIG. 5B is a segmented image of the hepatic vein of FIG. 5A, illustrating hepatic vein lumen, hepatic vein wall and hepatic nuclei.

FIG. 6A is an original tissue image of a hepatic artery.

FIG. 6B is a segmented image of the hepatic artery of FIG. 6A, illustrating hepatic artery, red blood cells and hepatic nuclei.

FIG. 7A is an original image of a hepatocyte.

FIG. 7B is a segmented image of the hepatocyte of FIG. 7A.

FIG. 8C is a pathological tissue map of the original image of FIG. 8A and segmented image of FIG. 8B.

FIG. 9C is a pathological tissue map of the original image of FIG. 8A and segmented image of FIG. 8B.

DETAILED DESCRIPTION OF THE EMBODIMENTS

Unless otherwise defined, all technical and scientific terms used herein have the same meaning as commonly understood by one of ordinary skill in the art to which this invention belongs. Although methods, systems and materials similar or equivalent to those described herein can be used in the practice or testing of the invention, suitable methods, systems and materials are described below. In the case of conflict, the present specification, including definitions, will control. In addition, the materials, methods, and examples are illustrative only and not intended to be limiting.

Moreover, although most of the embodiments of the present invention will be described with reference to a liver tissue analysis example, it is meant as an example only and not intended to be limiting.

Some embodiments of the present invention relates to an automated measurement and analysis system to quantitatively evaluate one or more tissue features/objects. The tissue specimens that can be analyzed by the present invention may include any tissue of any organ system, including, for example, liver, kidney, bile duct, gastrointestinal tract, lymphatic vessel, bronchia, blood vessels, cardiac, and nerve tissues.

Figure 1A:
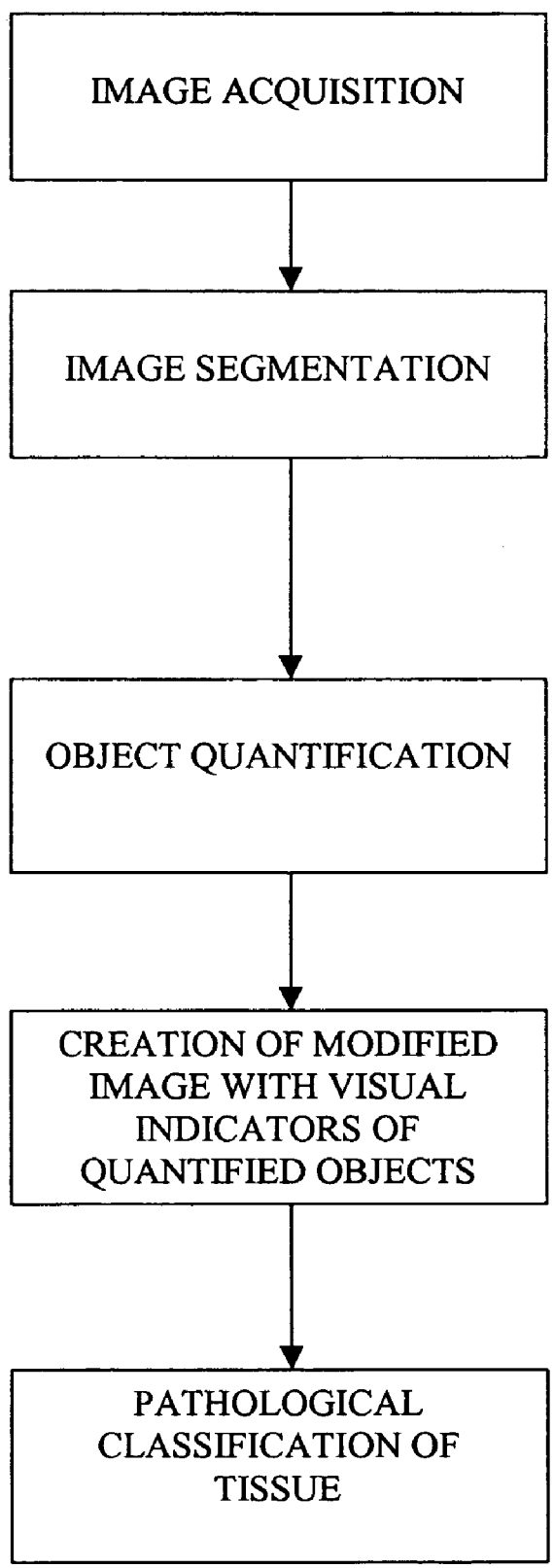
FIG. 1A is a general block diagram representing a process flow for pathological tissue mapping according to some of the embodiments of the present invention.
Figure 1B:
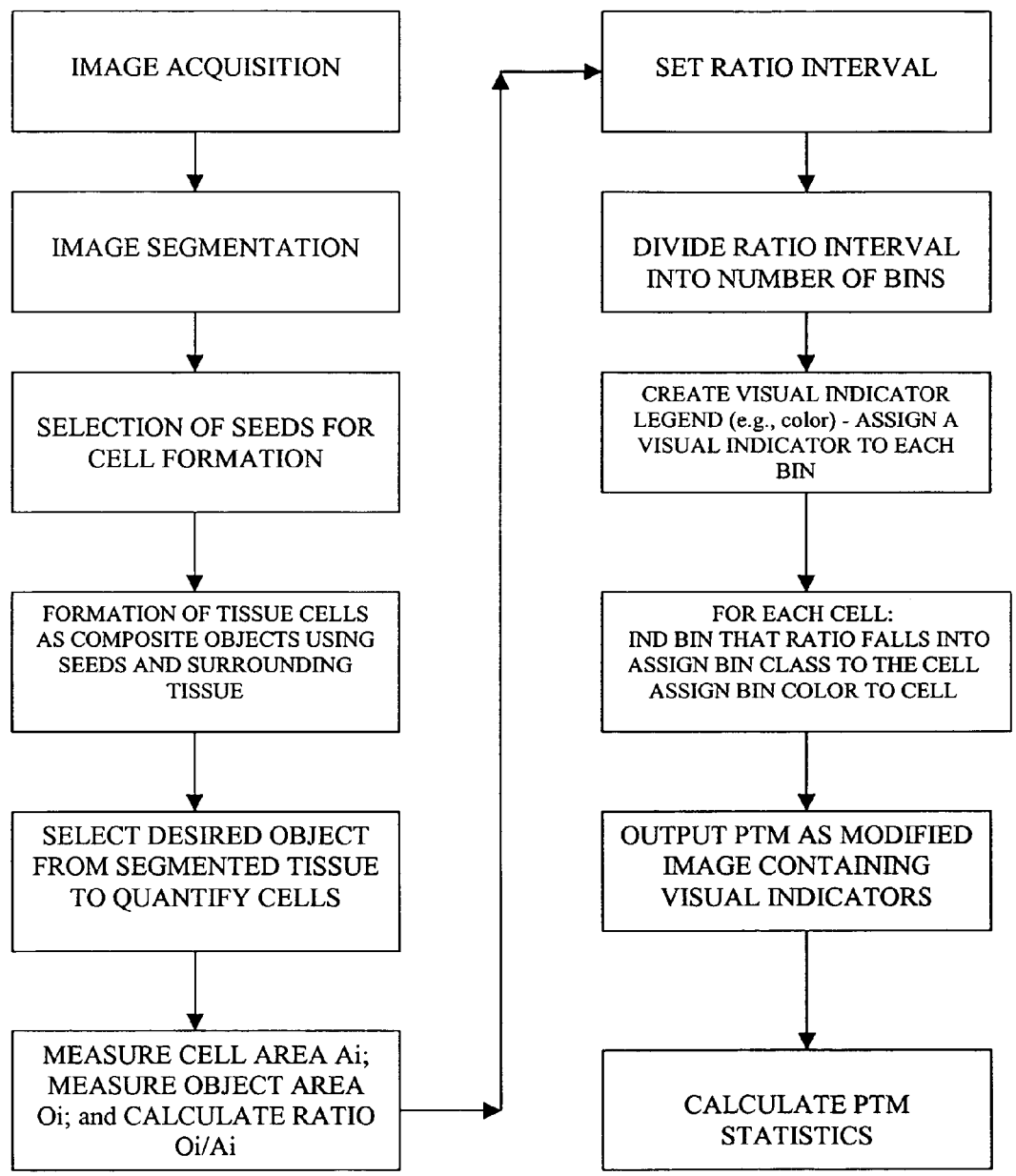
FIG. 1B is a block diagram representing a specific process flow for pathological tissue mapping according to one embodiment of the present invention.

The images are processed to produce a modified image of a tissue image with visual markers for indicating the pathology of the tissue (the PTM), that can more easily be analyzed by a diagnosis algorithm or pathologist. Once tissue specimens have been prepared, generally, the process for producing a PTM includes: acquiring an image of the tissue specimen; segmenting the image, classifying one or more objects, quantifying one or more objects, creating a modified image with visual indicators for the quantified objects; and pathologically classifying the tissue. A general overview of these steps is shown in FIG. 1A, with a more specific flow illustrated in FIG. 1B.

Figure 1C:
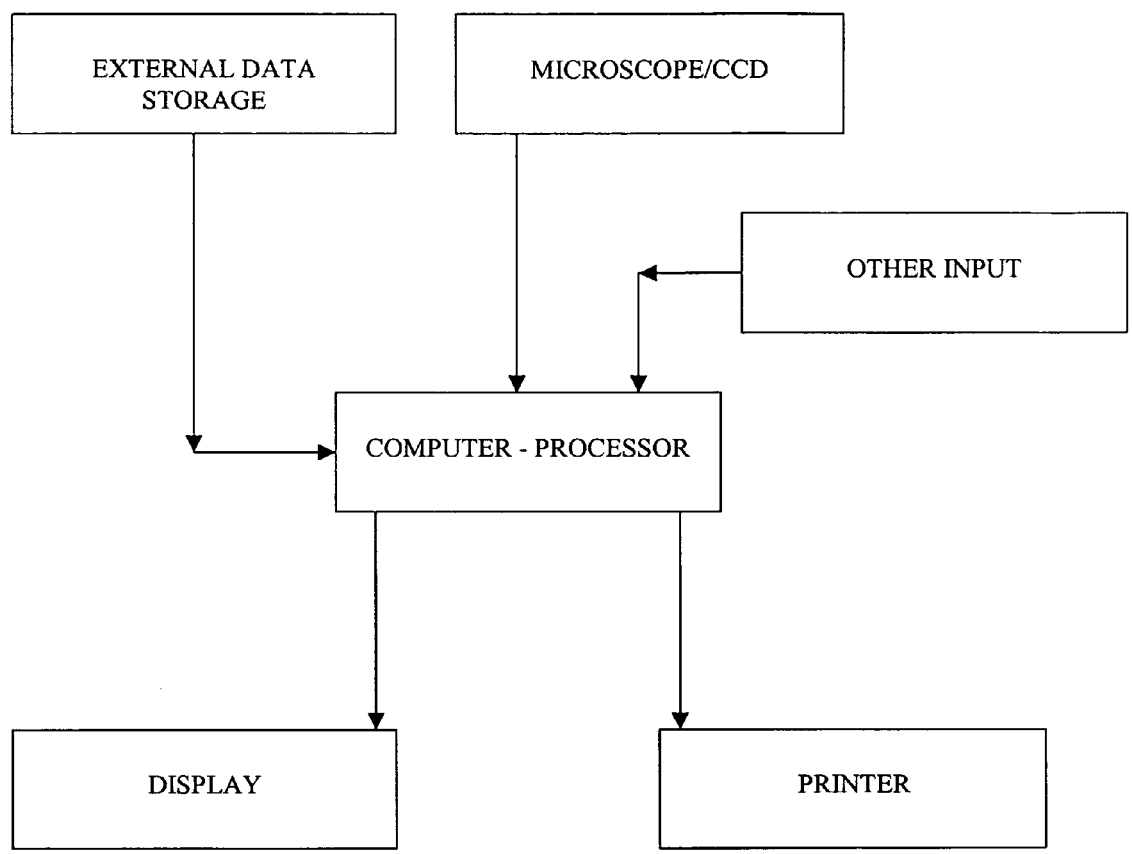
FIG. 1C is a representative system for carrying out method embodiments for the present invention.

FIG. 1C is a block diagram of a system for carrying out one or another of the method embodiments according to the present invention. As shown, a computer having an input module which may comprise a keyboard, ports (e.g., USB, parallel, SCSI, serial, and the like), a computing module (i.e., a computer workstation; a processor), a display and a printer. The ports may be used to connect image acquisition equipment (e.g., microscope having digital camera/CCD/CMOS device), as well as connecting external data storage devices (e.g., CD-ROM/RW; hard-drives, DVD, etc.). The system may be part of a larger network, and may communicate with such network either via wireless or wired (e.g., Ethernet) connection.

Tissue images may be obtained in any number of ways familiar to those of skill in the art. For example, X-ray images (including CAT scan images) and MRI images may be used, digitized to be input into a computer system. Particular preferred embodiments of the invention may obtain images by taking a photograph (preferably digital, but may be a traditional photo which is later digitized) of a magnified section of a tissue slide (e.g., a cross-sectional slice of tissue) on a microscope.

Segmenting tissue images may include one or more of: preprocessing images to correct color variations; location of tissue histopatholic objects; and classifying the found objects. A general overview of the segmentation process is illustrated in FIG. 2.

Initially, images may be pre-processed to standardize color variations from image to image (e.g., when using H&E stained tissue) of a tissue, using, for example, color (histogram) normalization. Images of tissues stained under different conditions and time may have color variations from image to image which may impair object classification in the image. Accordingly, histogram equalization may be used to bring image colors into close ranges.

To standardize the color variations in a set of images of a particular tissue, one tissue image may be selected as the representative image, and then the histogram for each of the tissue images remaining in the set may be adjusted so that each matches the histogram of the representative image. Alternatively, the histograms of several images may be used to derive an average (for example) histogram for the image set.

After pre-processing, tissue histopatholic objects are located. Each object may be a basic object or a composite object. Basic objects may include, for example, fundamental objects of tissue, including cell components (e.g., nuclei, sinusoids, fat and fat vacuoles, cytoplasm). Composite objects may be more complex than basic objects and are typically constructed from basic objects. Examples of composite objects include: cells (e.g., hepatocytes) and vascular tissues (e.g., bile duct, veins, arteries).

For example, a composite object may represent an entire cell, made up of basic objects including nuclei and cytoplasm (for example). Each cell may be "grown" using a cell growing algorithm, where a specific object ("seed") for cell formation (e.g., hepatic nuclei for the hepatocytes) is used as the basis for forming the cell, and then other objects are added to it.

Image segmentation may be based on object oriented image analysis, where an image (preferably non-equalized) is partitioned into homogenous groups with respect to color and shape of adjacent areas (i.e., image objects). The image information can be represented in different scale depending on the average size of the objects. Accordingly, using spectral and shape characteristics, image objects may then be referred to as instances of the tissue histopathological objects.

Besides using spectral and shape criteria to find objects, spatial relations between objects may also be taken into consideration to find objects. For example, sinusoids may be identified as elongated image objects containing red blood cells located within a range of known distances from Kupffer cells. Hepatocytes, tissue structure composed of cytoplasm, fat, fat vacuoles and hepatic nuclei bordering along sinusoids, may be found using hepatic nuclei objects as "seeds", and "growing" the hepatocyte sequentially by adding surrounding image objects until it reaches a sinusoid object. A region growing algorithm may be used for such cell formation.

To further enhance and automate the analysis process, tools commonly used with computer-aided-design (CAD) software may be used with the image-processing embodiments of the invention to aid in extracting objects from tissue images. The CAD tools offer the ability to pick points and group them, fit polynomial curves or splines to groups of points, and the ability to merge curve segments in an ordered fashion so they bound regions of interest. Such tools may be used to correct objects which have been incorrectly extracted.

After objects (basic and/or composite) have been found, the found objects may then be classified. For example, with nuclei classification, image objects may be classified as "nuclei" versus "non-nuclei" class objects using, for example, spectral and shape characteristics. The nuclei objects may be further sub-divided in two categories: "epithelial nuclei" and "inflammatory cells", for example. Moreover, with regard to liver tissue analysis, color intensity, shape and/or size thresholds may be used to classify the "epithelial nuclei" objects as "hepatic nuclei" and "Kupffer cells" nuclei objects. It is worth noting that sometimes a single nucleolus object is actually a plurality of real nuclei merged together. In such a situation, specialized morphological operations may defuse the nuclei objects into respective nuclei.

After nuclei objects have been classified, white spaces of the image may also be classified. White spaces are objects which are non-nuclei objects, and may be determined based on an intensity threshold (for example) of the non-nuclei objects. Objects such as red-blood cells, fat, fat vacuoles and sinusoids objects may then be derived from the white space.

Once objects have been classified, one or more objects, as well as one or more parameters of objects (a basic object may, in some embodiments, represent a parameter of a composite object, for example) may be quantified to analyze the tissue to determine a pathological condition of the tissue (e.g., normal versus abnormal) via a PTM. In some embodiments, quantification relates to the determination of a value for a specific object/parameter relative to a granularity unit of the image. A granularity unit may comprise another object, basic or composite (preferably composite), the tissue image itself, or a specific area of the image, color, color intensity, size, shape, and the like. The value of the specific object/parameter may be a quantity, a color, color intensity, a size, an area, or a shape. The value may also be a ratio; for example, the ratio may be the area of the specific object relative to the area of the granularity unit.

For example, in liver cells, a cell object (e.g., nucleus, fat) can be quantified by establishing a ratio of the area of the cell object to that of the area of the cell. Specifically, for each cell in the image, the cell area is measured ($A_i$), the object area ($O_i$) is measured, and the ratio of $O_i/A_i$ is determined. A ratio interval may then be set based on the range of ratios found in image.

The result of quantification may be organized into a number of "bins", where each bin is associated with a particular visual indicator (e.g., color). Representative pixels of the quantified objects in a modified image of the original tissue image are then marked with indicators (e.g., colorized) with the corresponding bin indicator to produce the PTM. Accordingly, a pathologist can view the PTM to easily determine the state of the tissue for a particular object quantification. The visual indicator may comprise a symbol, a color, a letter, a number and the like. Any visual detail to display attention to the quantified object in the modified image.

Liver Toxicology

For liver toxicology (for example) analysis, such quantification may be the analysis of hepatocytes (granularity unit) based on the fat content (fat molecule: quantified object) of the cell (a fat PTM) or hepatic nuclei (nuclei PTM). Fat accumulating in the liver is mainly in the form of triglycerides and fatty acids, and is also present in small amounts in the form of cholesterol, cholesterol ester and phospholipids. Fat accumulation in the liver may be designated pathologically as "fatty degeneration of the liver", and is also referred to as "fatty change", "fat infiltration", "fat metamorphosis" and "steatosis of the liver". Fatty liver is observed in a multitude of conditions such as: obesity, hyperalimentation (hypernutrition), alcoholic liver disease, diabetes mellitus, congestive heart failure, drug intoxication, pregnancy, Rey's syndrome, malnutrition (Kwashiorkor), chronic hepatitis and cirrhosis of different etiology.

FIGS. 3A-6B represent example segmented images of original tissue images.

For hepatic fat, the fat content generally ranges from 0 (a cell free of fat) to 1 (a cell replaced by fat), with varying degrees of fat therebetween (e.g., 0.1, 0.2, etc.). The range of fat content may be divided into the ratio interval—into a number of bins, each of which corresponds to a color (or color intensity/shade), in a graded range. Each hepatocyte cell object is then assigned to a particular bin based on its quantified fat content. The pixels in a modified image of the original tissue image corresponding to each hepatocyte cell object is then colorized with the corresponding bin color to establish the PTM of the tissue. The completed PTM may then be output on a LCD/CRT display or output to a printer (and/or database) for review.

In general, in many quantification, the ratio interval may be set up to vary from 0 to 1, but sometimes the bins derived from the interval [0, 1] do not have enough resolution; almost all ratios can fall into one or several bins. In order to set an informative bin system, it is recommended to experimentally find a meaningful ratio upper level (for example 0.5). The chosen upper level should work over all cells presented in a studied image or image set. It is worth noting that decreasing or increasing the number of bins may result in under or over representation of cell classes respectively.

Figure 8A:
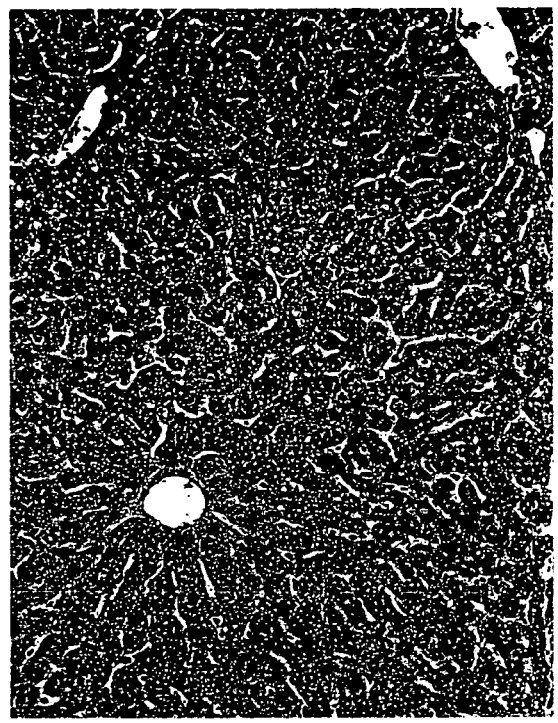
FIG. 8A is an H&E stained tissue image of normal liver tissue.
Figure 8B:
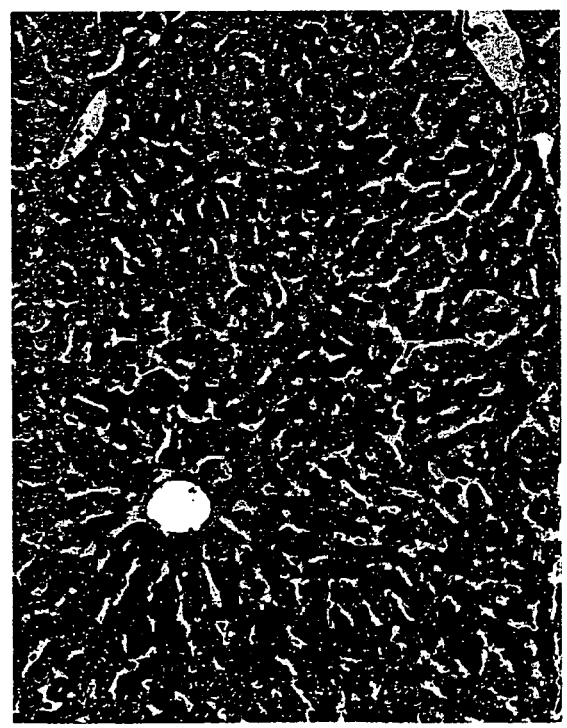
FIG. 8B is a segmented image of the stained image of FIG. 8A.
Figure 9A:
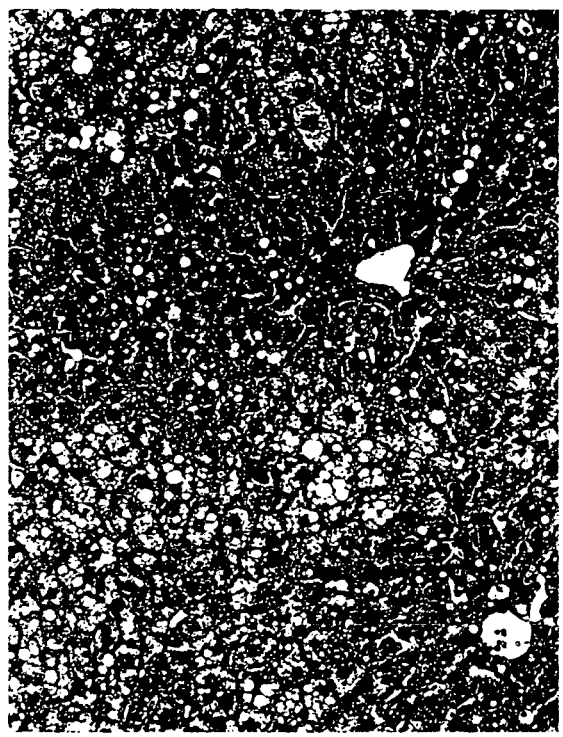
FIG. 9A is an H&E stained tissue image of abnormal liver tissue.
Figure 9B:
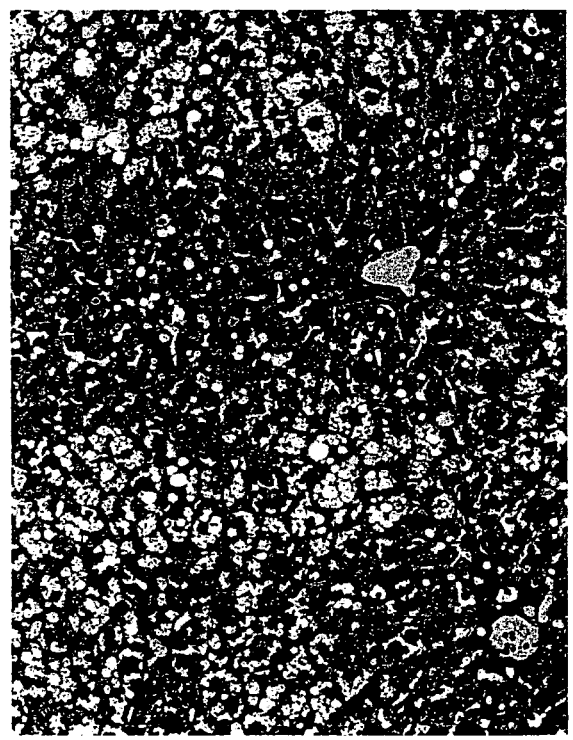
FIG. 9B is a segmented image of the stained image of FIG. 8A.

In the liver toxicology example, hepatocytes having a low fat content may be assigned to a blue bin, cells having a moderate fat content may be assigned to a yellow bin, and cells having a high fat content may be colored red. However, to achieve a smooth color transformation between the three representative colors, for example, multiple bins (representing shades between the colors blue-to-yellow, and yellow-to-red) for cells having a particular fat content may be used. For example, using 10 bins: bin 1=0 fat content; bin 2=12.5% fat content; bin 3=25% fat content; bin 4=37.5% fat content; bin 5=50% fat content; bin 6=62.5% fat content; bin 7=75% fat content; bin 8=87.5% fat content; bin 9=95% fat content; and bin 10=100% fat content. Bin 1 may represent the blue color, bin 5 yellow and bin 9 red. Thus, bins 2-4 may be varying shades between blue and yellow and bins 6-8 may be varying shades between yellow and red. Alternatively, bins 1-3 may be blue, bins 4-7 may be yellow, and bins 8-10 red. FIGS. 8A-8C represents a tissue image, a segmented image, and a PTM for a specimen of normal liver tissue (bin legend also included), and FIGS. 9A-9C represent the corresponding figures for abnormal liver tissue. As shown, the PTM for the normal tissue includes a low fat content (generally between 0.2 and 0.5), while the fat content is quickly determined to be higher than that of the normal tissue because of the increase in the number of hepatocytes colored yellow.

After the PTM is created, the PTM statistics (e.g., hepatocyte fat content) may be loaded into a database. For example, the relative areas occupied by each cell class—percentage of cells with low object content, with moderate content etc. Other characteristics may be assigned to created cell classes.

Prostate Cancer Analysis

A PTM may be generated for other histopathological tissue types or quantifications for prostate cancer. In prostate cancer, the granularity unit may comprise a tissue core (tile) gland unit, or to an entire tissue section. A prostate tissue core (tile) gland unit is a key structure for accessing the distortion of the normal prostate architecture (i.e., the degree of malignancy). A gland unit includes lumen, epithelial cells and cytoplasm objects. The relative lumen area with respect to tissue core area may serve as the quantification object for a PTM. This ratio characterizes cancer development in the tissue core: the more aggressive a cancer, the more gland units with small relative area values exist.

A PTM may also be created to determine Gleason grade on an entire tissue section. The tissue section is partitioned on uniform gland units, and assigned a Gleason grade. The Gleason grade is an integer number from 1 to 5, characterizing cancer aggressiveness. For example, five (5) bins may be established, each corresponding to a particular Gleason grade. Thereafter, each gland unit is matched with a bin, and the pixels in the tissue image corresponding to a respective gland unit are then colorized according to the color of the respective bin. The PTM is then generated and output to a user.

Other Applications of PDMs

The following is a list of cancers in which embodiments of the present invention may aid in determining the pathology thereof.

Figure 10:
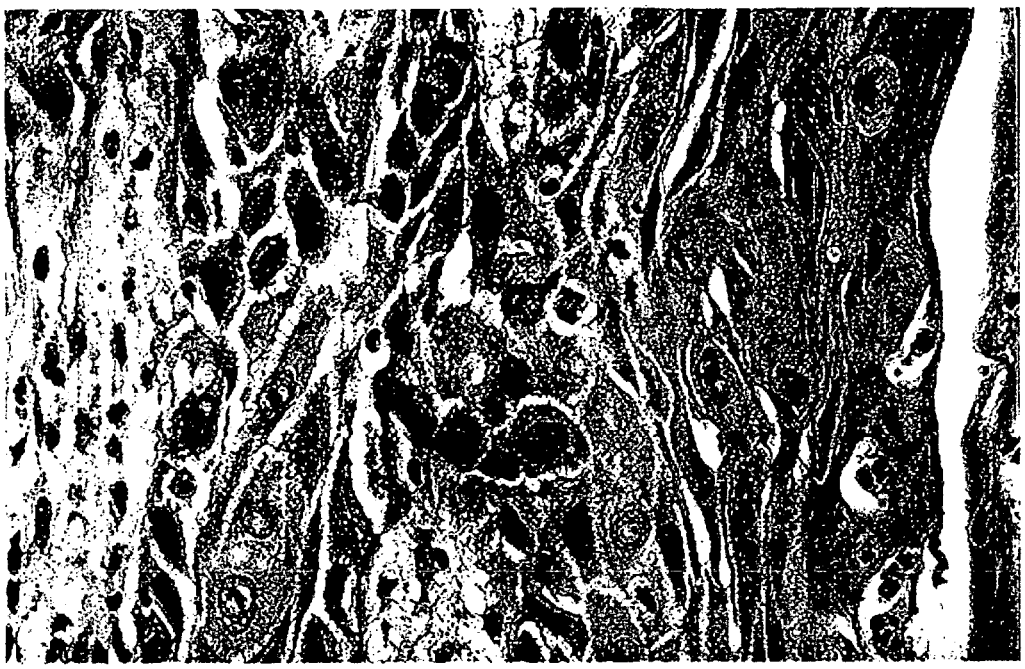
FIG. 10 illustrates nests of polygonal cells with pink cytoplasm and distinct cell borders in squamous cell lung carcinoma.

Squamous cell Lung Carcinoma. Cytoplasm, distinct cell borders and/or interceller bridges may be quantified and used to generate a PTM to diagnosing or determining an extent of squamous cell carcinoma. Poorly differentiated carcinomas have a worse prognosis and they are more aggressive than the well differentiated. A well-differentiated carcinoma resemble a normal lung architecture. FIG. 10 illustrates this cancer, showing nests of polygonal cells with pink cytoplasm and distinct cell borders. The nuclei are hyperchromatic and angular.

Figure 11:
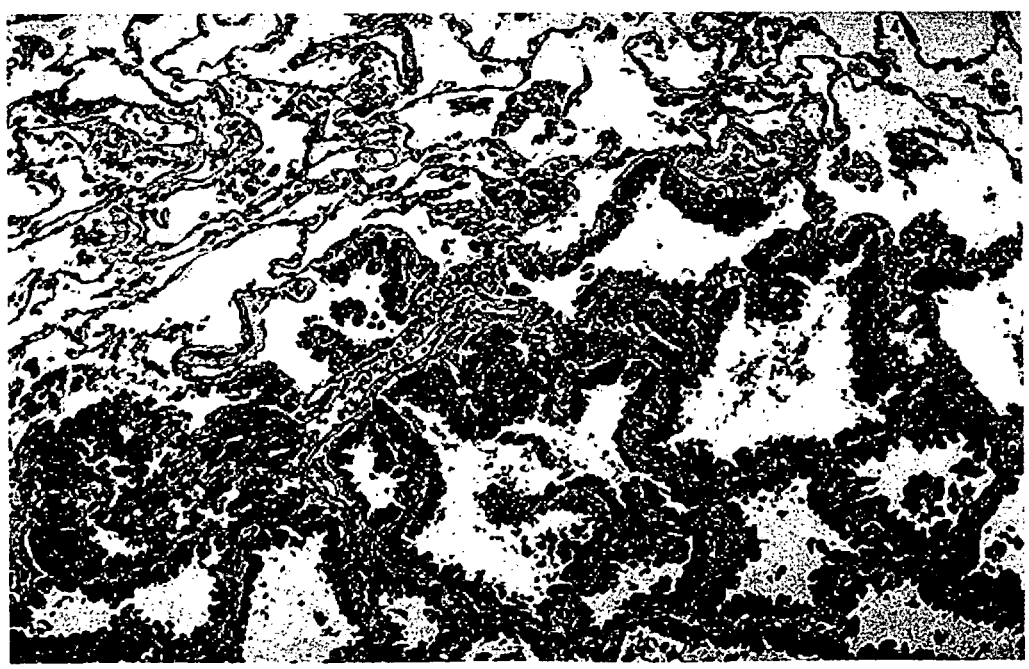
FIG. 11 is an image of columnar cells with reference to bronchioloalveolar lung carcinoma.

Bronchioloalveolar Lung carcinoma. Columnar cells may be quantified to determine diagnosis and/or extent of bronchioloalveolar carcinoma. Cancerous columnar cells are well-differentiated and can be seen in FIG. 11.

Figure 12:
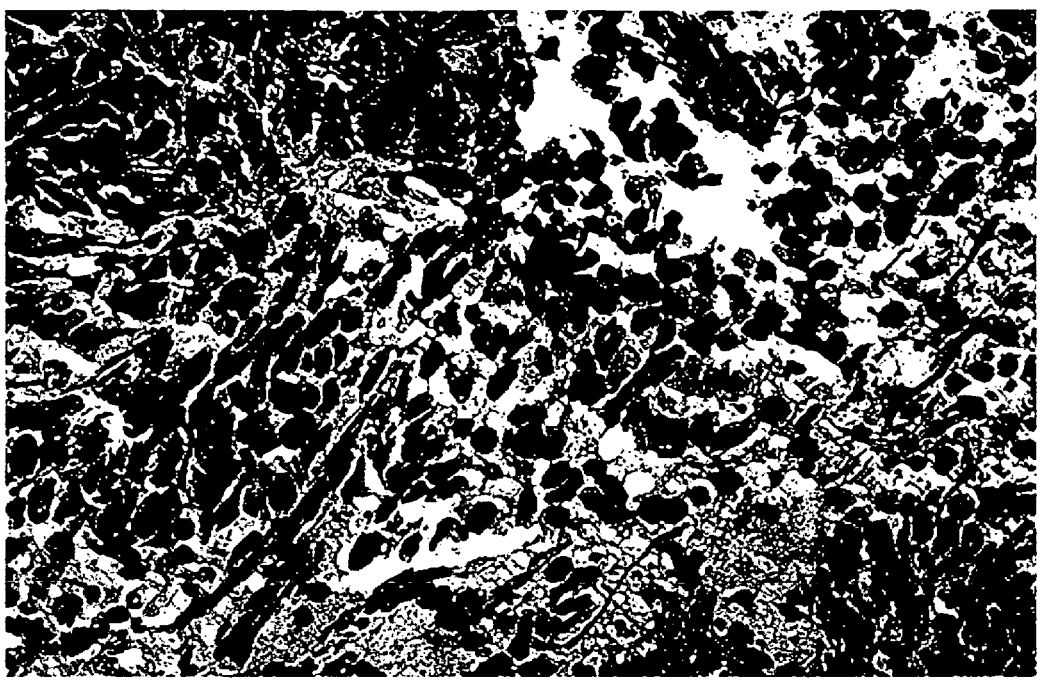
FIG. 12 is an image showing small dark blue cells with minimal cytoplasm packed together in sheets of oat cell disease.

Small cell Anaplastic (oat cell). Cells having minimal cytoplasm may be quantified to produce a PTM to determine a diagnosis and extent of small cell anaplastic (oat cell). As shown in FIG. 12, small cell anaplastic is evident from the small dark blue cells with minimal cytoplasm are packed together in sheets, which typify oat cell disease.

Figure 13:
FIG. 13 is an image of tubular structures of malignant glandular neoplasia (colon cancer).
Figure 14:
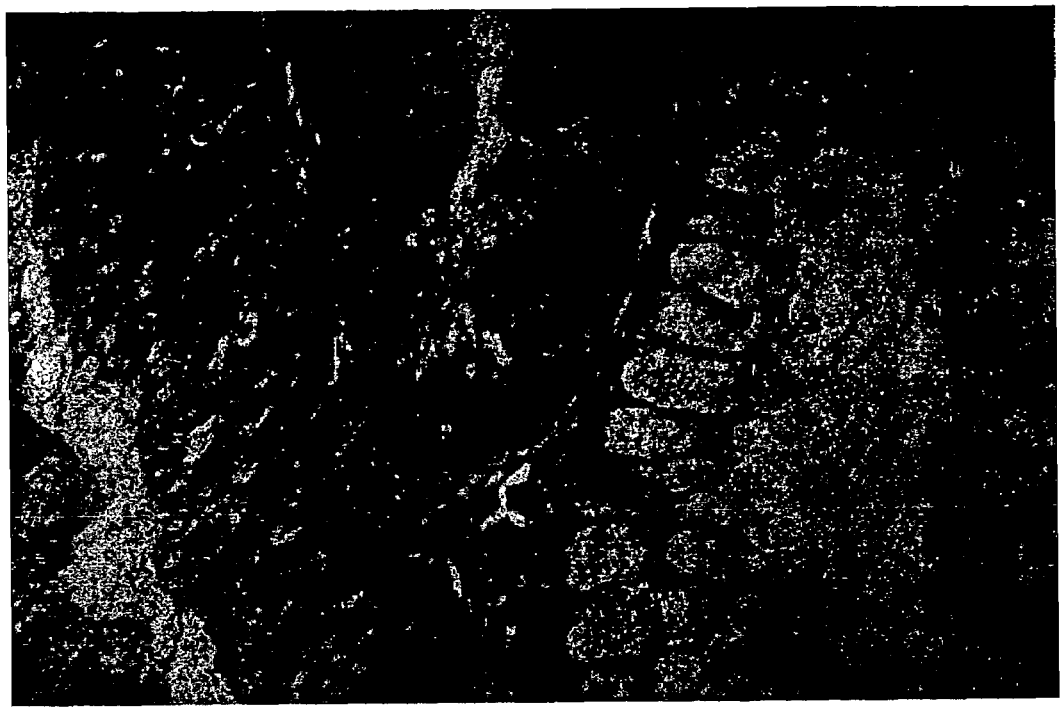
FIG. 14 is an image of goblet cells (colon cancer).

Colon Cancer. Malignant glandular neoplasia, which are tubular structures (FIG. 13), with necrosis and hyperchromasia, may be quantified to produce a PTM to determine colon cancer. In addition, the cancer may be diagnosed by reviewing cancerous goblet cells (FIG. 14) may also be quantified to produce a PTM for colon cancer.

Figure 15:
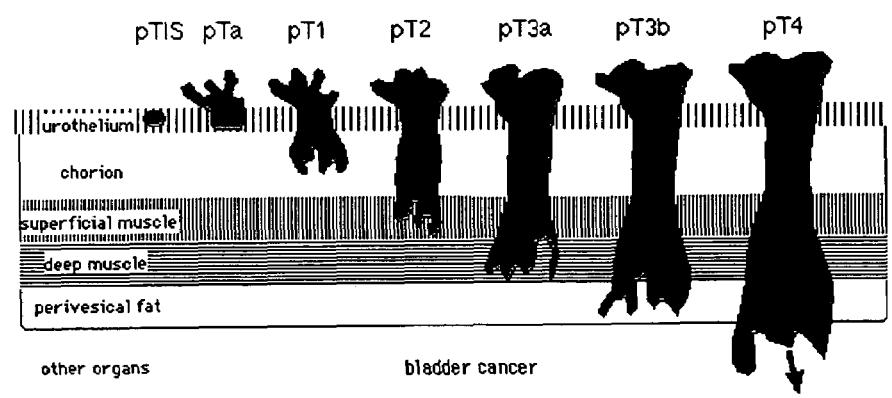
FIG. 15 illustrates a pathological staging of bladder cancer based on invasiveness.
Figure 16:
FIG. 16 is an image of papillary projections for determining transitional cell carcinoma of the urothelium.
Figure 17:
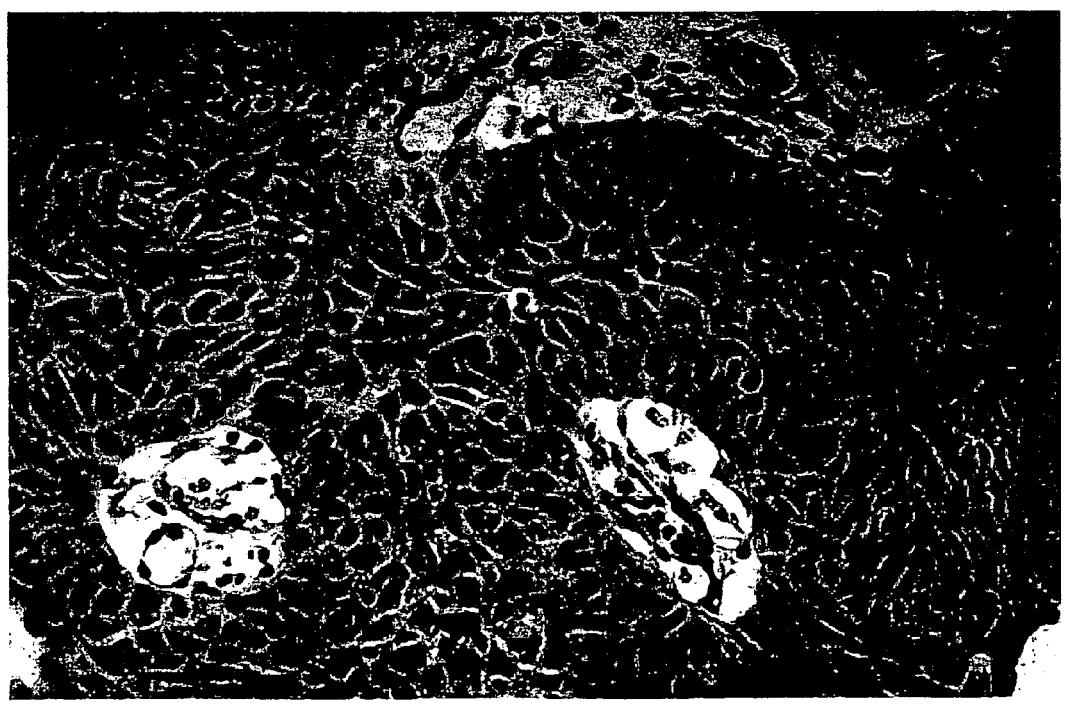
FIG. 17 is an image of neoplastic cells having uniform oval nuclei, abundant cytoplasm, and are arranged in ribbons of tissue supported by delicate vascular cores or "stalks".
Figure 18:
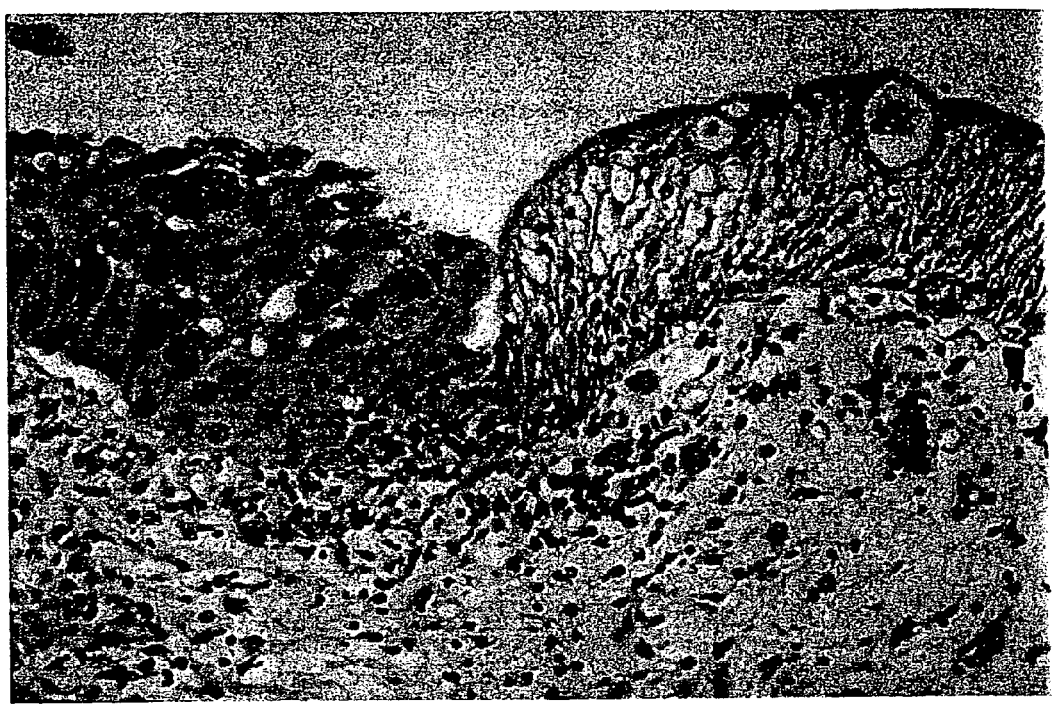
FIG. 18, a photomicrograph of carcinoma in situ in the bladder.

Bladder cancer. Muscle invasiveness of transitional cell carcinomas may be quantified and used to produce a PTM, to determine bladder cancer. FIG. 15 illustrates a pathological staging of bladder cancer based on invasiveness. Quantification of papillary projections (FIG. 16 illustrating cancerous projections) for determining transitional cell carcinoma of the urothelium may also be used to produce a PTM. As shown in FIG. 17, neoplastic cells have uniform oval nuclei, abundant cytoplasm, and are arranged in ribbons of tissue supported by delicate vascular cores or "stalks". FIG. 18, a photomicrograph of "carcinoma in situ" in the bladder. The epithelial cells on the left have malignant cytologic objects including very large, irregularly shaped and darkly staining nuclei, which contrasts with the normal appearance of the urothelial cells on the right. Accordingly, the foregoing may be quantified to produce a PTM.

Pathology Models

A PTM and/or basic object measurements may form a feature vector for biostatistical modeling, where advanced statistical models are used in order to classify the tissue image as being normal, abnormal, diseased and the like. Specifically, a neural network or SVR machine may be trained to make a comparison of a PTM to a PTM (or statistics thereof) from profiled data. To that end, one embodiment of the invention provides a method of automated H&E image analysis for liver toxicology and other medical areas.

Database

The present invention is also directed to a robust database that is based upon input parameters that may be uniformly investigated and extracted from different studies. Specifically, embodiments of the invention include a database that allows input and retrieval of data and images needed to compare studies taking place at different times, with different protocols, and with measurements made by different systems. Accordingly, the database may preserve the utility of the stored information through continued lossless combination and comparability with subsequently acquired information and the accessibility of the stored images for automated re-analysis.

Images and data may be stored together or separately (preferred). The data may be kept in spreadsheets, or through fields of a relation database. If the images and data are separately stored, the images and data can be merged using hyperlinks (for example). From a practical standpoint, a more robust database that manages the input and retrieval of data and images may be used to compare studies taking place at different times, with different protocols, and with measurements made by different systems. The database may include sufficient and accurate information to enable the user to normalize the results to make meaningful comparison between studies.

EXAMPLES

Example 1

Liver Tissue Image Segmentation—Portal Tract

Bile Duct

Analysis of Bile Duct demonstrates that it is a tissue structure consisting of lumen (white area on the original image fragment FIG. 4A; colored yellow on the segmented image FIG. 4B) lined by simple cuboidal or columnar epithelium (epithelial nuclei painted by blue color on the segmented image).

Vessels

Hepatic Vein

Analysis of the Hepatic Vein (see FIG. 5A original image; FIG. 5B segmented image) which is the largest diameter vessel, reveals it to be another tissue structure consisting of lumen (large white area on the original image fragment colored light grey on the segmented image) which has the typical, thin-walled structure relative to the diameter of the lumen and irregular outline of all veins (colored aquamarine on the segmented image).

Hepatic Artery and Arterioles

The smaller diameter, thick-walled vessels with the typical structure of arterioles and arteries are branches of the Hepatic Artery which supplies oxygenated blood to the liver. The Hepatic Artery is composed of a large white area (lumen) surrounded by a smooth muscle fibers wall that his thickness approaches the diameter of the lumen. Occasionally red blood cells can be found within the lumen area. See FIG. 6A original image and FIG. 6B segmented image of Hepatic artery.

Lymphatics

Another type of vessel, lymphatics, are also present in the portal tracts, but since their walls are delicate and often collapsed they are not readily seen.

Hepatocytes

Hepatocytes are large, polyhedral cells which have a variable cytoplasmic appearance depending on the nutritional and health status of the body. In well-nourished individuals, hepatocytes store significant quantities of glycogen and process large quantities of lipid. Both of these metabolites are partially removed during routine histological preparation thereby leaving irregular, unstained areas within the cytoplasm. (vacuoles). The remaining cytoplasm is strongly eosinophilic due to a high content of organelles.

The nuclei of hepatocytes are relatively large with peripherally dispersed chromatin and prominent nucleoli. The nuclei, however, vary greatly in size. Occasional binucleate cells are seen in section although up to 25% of all hepatocytes are bionucleate. The arrangement of hepatocytes within the liver parenchyma is distinct. The hepatocytes form flat, anastomosing plates usually one cell thick between which sinusoid course.

Analysis of hepatocytes (FIGS. 7A-7B; 8A-8B) reveals cells formed by hepatic nuclei (dark ring on the pink background) and surrounding cytoplasm. The cell boundaries often go along sinusoids. A healthy cell may have an insignificant amount of fat. The more fat present in the cell, the more abnormal the cell is, and the liver is diagnosed as fatty liver. A hepatic nuclei can be completely replaced by excess fat deposit within the liver cell. FIGS. 8A-8C depict images of normal hepatocytes and FIGS. 9A-9C are images of abnormal hepatocytes containing excess fat.

The resulting PTM for the present example is presented in FIGS. 8C (normal fat content) and 9C (abnormal fat content). The color changes from blue (low fat content) through yellow (moderate fat content) to red (high fat content). As is clear, there is a significant amount of fat (light round different size objects) around the hepatic nuclei in the abnormal hepatocytes.

Example 2

This study was undertaken to demonstrate neural network and linear discriminant analysis (LDA) modeling capabilities of the present invention. Specifically, the study involved the acquisition and analysis of sections of rat liver with the overall objective being to classify the sections as normal or abnormal. Being able to automate this process while simultaneously achieving a high-level of classification accuracy allows for the creation of a high-throughput platform used to objectively screen for toxicities in pre-clinical studies.

The study was divided into two phases. The initial phase used a set of 100 rat liver sections as a training set; 80 normal liver sections and 20 abnormal. The image analysis process was then applied to an unlabeled set of 100 rat liver sections in the second phase of the study in which the statistical models designed in the training phase were tested.

Pathology

Both the training and test set of rat liver sections were H&E-stained slides. Each set consisted of 100 slides. The training set of slides contained 80 normal liver sections and 20 abnormal liver sections. The testing set contained no information as to whether the sections were considered normal or abnormal.

Images were taken by a pathologist, using the Spot Insight QE digital camera mounted on the Nikon Eclipse E400 microscope with the use of the Advance Spot software. The working objective was a 20X Plan Apo, and 24 bits/pixel color images were taken and stored in TIF uncompressed file format with size 1200×1600 pixels. The resolution was 2744 pixels/mm.

Tissue Image Processing

The tissue image processing system provides necessary information for the objective classification of an H&E stained liver section as being normal or abnormal, where basic and composite histopathological objects in the tissue image were found and quantified.

The image segmentation was conducted by partitioning a tissue image into non-overlapping, constituent connected regions and assigning a meaningful label to each region. The labels correspond to histopathological objects of the liver tissue. The image analysis method defines quantitative characteristics (measurements) for all objects detected on the segmented tissue image. The implemented image processing system consists of three main components: preprocessing, image segmentation and object measurements.

Basic and Composite Morphological Objects

The following basic pathological objects were selected: nuclei, sinusoids, fat, fat vacuoles, blood vessels: hepatic veins and arteries, cytoplasm, red-blood cells. The nuclei were further classified as hepatic, kupffer, epithelial and inflammatory cells. The considered morphological structures which were composed of the basic objects were: hepatocytes with fat and fat vacuoles, hepatocytes with hepatic nuclei, hepatocytes. The hepatocytes are morphological tissue elements formed by hepatic nuclei and attached cytoplasm.

Preprocessing

Color variations from image to image are the most common drawback of the H&E staining procedure. The spectral properties of the same objects also vary from image to image which affects the accuracy and robustness of segmentation. A color normalization technique based on histogram matching was used in order to address the color variation problem.

An image having good staining quality and representative color was chosen as a reference. The color histograms of the remaining images were transformed to match the RGB histograms of the reference image.

Image Segmentation

The tissue images are 24 bits/pixel color images stored in TIF file format with size 1200×1600 pixels. In the image processing system, each image is represented by six layers: three original RGB layers and three normalized layers. Basic pathological objects form classes; segmented objects (e.g. nuclei) are the instances of a class. Besides the basic classes special auxiliary classes were created.

Conceptually the image processing system was designed as a multilevel system. Each level is a virtual image plane with class instances corresponding to a certain processing stage.

Level 1 is the starting level where the whole image is partitioned into non-overlapping, unclassified regions (image objects). The image objects may be merged by some criteria on the upper levels forming the super-objects with respect to objects on the lower level (sub-objects). The image objects may be networked so that each object is associated to its neighborhood, its super-object and its sub-objects. All sequential processing is about proper management (classification and merging) of the obtained image objects. At the beginning, all image objects were classified into three auxiliary classes "nuclei" (dark), "white space" (light) objects and "unclassified" objects respectively.

Nuclei Segmentation

The nuclei segmentation started from the second level. Three color normalized layers were used to classify image objects as "nuclei" and "unclassified" objects. The pathologically valid nuclei (instances of the class "Nuclei") were formed from the "nuclei" objects with the use of growing (adding the neighboring "unclassified" objects to a nucleus) and fusion (merging of same class objects into one object), and morphological opening/closing algorithms were applied in order to improve nuclei segmentation.

White Space Segmentation

The segmentation results from the second level were carried over to the third level using a level copy operation. On that level, all "unclassified" objects were classified to "white space" and "unclassified" (remaining) objects, respectively. Image object brightness was used as the primary object for classification. A set of complications prevented the system from using brightness based threshold as ultimate classifier of "white space" objects: "white space" objects are not always "light", low contrast images produces false "white space" objects, and "white space" area on the tissue often filled with blood and other fluids.

In order to overcome the above outlined problems, actual "white space" objects were composed with the use of the mentioned growing, fusion and morphological opening algorithms. The obtained "white space" objects were classified to (Levels 3 and 4): red blood cells, sinusoids: elongated, contain red blood cells and within certain distance from kupffer cells, fat vacuoles: round, small and relatively dark "white space" objects, vessels: relatively big "white space" objects with smooth shape, and fat: remaining "white space" objects. All the remaining "unclassified" image objects in Level 4 are classified as instances of "cytoplasm". After fusion they form the cytoplasm area.

Morphological Object Segmentation

The morphological object segmentation is an example of a high stage of the tissue image processing. The detected histopathological basic objects such as hepatic nuclei and cytoplasm were used to form the hepatocytes. The hepatocytes formation algorithm may be outlined as follows. The hepatic nuclei were used as seeds. A region growing algorithm was applied in order to grow hepatocytes from the cytoplasm, fat and fat vacuoles class objects. The cell continued growing until the following conditions were met: a) two growing hepatic cells touch each other; and b) the hepatic cell achieved a predefined size (measured as the distance from the seed). In the case when two or more hepatic nuclei were located close together, a modified growing algorithm kept the hepatocytes isolated.

Object Measurements

The object measurement is the final stage of tissue image processing. The measurements are quantifications of all segmented histopathological basic objects and structures.

Histopathological Object Quantification

For each segmented class of the basic histopathological objects of the tissue image, the following data were output: number of the objects (n/a for cytoplasm area), class area relative to the total tissue area (%), individual object statistics: min/max area, average and standard deviation of the area values over the image.

Morphological Object Quantification

The unique phase of the tissue image processing is the quantification of morphological objects. The analysis of hepatocytes based on the fat and hepatic nuclei contents are examples of such quantification.

The ratio of the fat (hepatic nuclei) area of a single hepatocyte to the hepatocyte total area is determined. The ratio constitutes the fat (hepatic nuclei) content. It serves as a measurement of cell health: normal vs. abnormal. The theoretical fat and hepatic nuclei contents range from 0 (a cell free of fat or hepatic nuclei) to 1 (a cell replaced by fat or hepatic nuclei). This range is divided into a number of bins. Coloring each cell based on a color associated with its bin range produces the steatotic PTM. The color changes from blue (a low content) through yellow (a moderate content) to red (a high content).

The fat PTM was processed on the Level 5 objects and nuclei density PTM on the Level 6 objects. All hepatocytes were classified into ten classes: "Fat Ratio" 1-10 and "Hepatic Nuclei Ratio" 1-10.

The PDMs, hepatocytes area and basic object measurements form a feature vector for biostatistical modeling.

Segmentation Accuracy

The global segmentation accuracy for all objects, as measured by a pathologist's assessment, was 80%-90%.

The preferred embodiments described herein are provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. Accordingly, this invention includes all modifications encompassed within the spirit and scope of the invention as defined by the claims.

The automation of object extraction in embodiments of the present invention create a high throughput capability that enables analysis of serial sections for more accurate measurements. Measurement results may be input into a relational database where they can be statistically analyzed and compared across studies. As part of the integrated process, results may also be imprinted on the images themselves to facilitate auditing of the results. The analysis may be fast, repeatable and accurate while allowing the pathologist to control the measurement process.

What is claimed is:

1. A method for tissue analysis comprising: using one or more computers to perform the operation of:

acquisition of a tissue image corresponding to a tissue sample;

segmentation of the image into a plurality of objects;

classifying the plurality of objects into one or more object types;

quantifying at least one parameter corresponding to at least one of said object types to produce a quantification result for each corresponding object of the at least one of said object types;

establishing a range of the quantification results;

dividing the range into a plurality of bins, wherein each bin represents a visual indicator for producing a modified image of the tissue image;

assigning each object of the at least one of said object types to a bin based on the quantification result for each object; and modifying corresponding pixels for each object of the at least one of said object types in the modified image with the visual indicator of the bin corresponding to the respective object.

2. The method according to claim 1, further comprising classifying the tissue sample based on the modified image.

3. The method according to claim 2, wherein the tissue is classified as normal or abnormal.

4. The method according to claim 1, wherein the visual indicator is selected from the group consisting of: color, color intensity, size, shape, symbol, letter and number.

5. The method according to claim 1, wherein the tissue image comprises an image of liver tissue and the at least one of said object types comprises a hepatocyte and the parameter comprises fat content.

6. The method according to claim 5, wherein quantification comprises a ratio of the area of fat contained in each hepatocyte, to the area of the respective hepatocyte.

7. The method according to claim 1, wherein the method is used to identify toxic effect or response.

8. The method according to claim 1, wherein the method is used to identify immunological reactions.

9. The method according to claim 1, wherein the method is used to identify morphological lesions caused by disease selected from the group consisting of: acute, sub-acute or chronic hepatitis; inflammatory or necrotic cholestasis; fibrosis; granulomatous hepatitis; macro or microvesicular steatosis; vascular lesions; and hepatic tumors.

10. The method according to claim 1, further comprising training a neural network and/or a support vector machine using the modified image.

11. The method of claim 1, wherein said quantifying at least one parameter comprises quantifying micro-anatomic data corresponding to at least one of said object types.

12. The method of claim 1, wherein said quantifying at least one parameter comprises quantifying molecular data corresponding to at least one of said object types.

13. The method of claim 1, wherein said tissue image comprises an image of prostate tissue, said at least one of said object types comprises lumen, and said quantifying at least one parameter comprises quantifying lumen area relative to tissue area.

14. The method of claim 1, wherein said tissue image comprises an image of prostate tissue, said at least one of said object types comprises a gland unit, and said quantifying at least one parameter comprises determining a Gleason grade corresponding to said gland unit.

15. The method of claim 1, wherein said quantifying at least one parameter comprises quantifying a size corresponding to at least one of said object types.

16. The method of claim 1, wherein said quantifying at least one parameter comprises quantifying a shape corresponding to at least one of said object types.

17. The method of claim 1, wherein said quantifying at least one parameter comprises quantifying a color corresponding to at least one of said object types.

18. The method of claim 1, wherein said quantifying at least one parameter comprises quantifying a color intensity corresponding to at least one of said object types.

19. The method of claim 1, wherein said quantifying at least one parameter comprises quantifying an area corresponding to at least one of said object types.

20. The method of claim 1, wherein said quantifying at least one parameter comprises determining a quantity corresponding to at least one of said object types.

21. The method of claim 1, wherein said quantifying at least one parameter comprises quantifying at least one parameter corresponding to at least one of said object types relative to a granularity unit of the tissue image.

22. The method of claim 21, wherein said granularity unit comprises a cell and said at least one of said object types comprises a cell component.

23. The method of claim 1, wherein said classifying the plurality of objects comprises classifying the plurality of objects into a plurality of object types.

24. The method of claim 1, wherein said one or more object types comprises at least one tissue object.

25. The method of claim 24, wherein said at least one tissue object comprises a bile duct.

26. The method of claim 24, wherein said at least one tissue object comprises a vein.

27. The method of claim 24, wherein said at least one tissue object comprises an artery.

28. The method of claim 24, wherein said at least one tissue object comprises a gland.

29. The method of claim 1, wherein said one or more object types comprises at least one histopathological object.

30. The method of claim 1, wherein said one or more object types comprises at least one cell component.

31. The method of claim 30, wherein said at least one cell component comprises nuclei.

32. The method of claim 30, wherein said at least one cell component comprises cytoplasm.

33. The method of claim 30, wherein said at least one cell component comprises a vacuole.

34. The method of claim 30, wherein said at least one cell component comprises fat.

35. The method of claim 1, wherein classifying the plurality of objects into one or more object types comprises:
designating a first object type as a seed; and
implementing region growing based on said seed to form a second object type.

36. The method of claim 1, wherein modifying corresponding pixels for each object of the at least one of said object types comprises replacing pixels of said object with pixels of a color of the bin corresponding to the respective object.

37. The method of claim 1, further comprising preprocessing the tissue image to correct color variation.

38. The method of claim 1, further comprising applying a filter to enhance at least one object type of said one or more object types.

39. The method of claim 1, further comprising applying a filter to suppress at least one object type of said one or more object types.

40. A computer readable medium having computer instructions for enabling a computer system to perform a method for tissue analysis, the method comprising:
acquisition of a tissue image corresponding to a tissue sample;
segmentation of the image into a plurality of objects;
classifying the plurality of objects into one or more object types;
quantifying at least one parameter corresponding to at least one of said object types to produce a quantification result for each corresponding object of the at least one of said object types;
establishing a range of the quantification results;
dividing the range into a plurality of bins, wherein each bin represents a visual indicator for producing a modified image of the tissue image;
assigning each object of the at least one of said object types to a bin based on the quantification result for each object; and
modifying corresponding pixels for each object of the at least one of said object types in the modified image with the visual indicator of the bin corresponding to the respective object.

41. The computer readable medium according to claim 40, where the method further includes displaying and/or printing the modified image.

42. A system for tissue analysis comprising:
acquisition means for acquiring a tissue image corresponding to a tissue sample;
segmentation means for segmenting the image into a plurality of objects;
classifying means for classifying the plurality of objects into one or more object types;
quantifying means for quantifying at least one parameter corresponding to at least one of said object types to produce a quantification result for each corresponding object of the at least one of said object types;
establishment means for establishing a range of the quantification results;
dividing means for dividing the range into a plurality of bins, wherein each bin represents a visual indicator for producing a modified image of the tissue image;
assigning means for assigning each object of the at least one of said object types to a bin based on the quantification result for each object; and
modifying means for modifying corresponding pixels for each object of the at least one of said object types in the modified image with the visual indicator of the bin corresponding to the respective object.

43. A system for tissue analysis comprising:
an input for inputting a digital image;
an output comprising at least one of a display and a printer;
a processor for processing computer instructions and data, the processor configured to:
segment the image into a plurality of objects;
classify the plurality of objects into one or more object types;
quantifying at least one parameter corresponding to at least one of said object types to produce a quantification result for each corresponding object of the at least one of said object types;
establish a range of the quantification results;
divide the range into a plurality of bins, wherein each bin represents a visual indicator for producing a modified image of the tissue image;
assign each object of the at least one of said object types to a bin based on the quantification result for each object; and
modify corresponding pixels for each object of the at least one of said object types in the modified image with the visual indicator of the bin corresponding to the respective object.

44. The system according to claim 43, wherein the processor is further configured to classify the tissue sample based on the modified image.

45. The system according to claim 44, wherein the tissue is classified as normal or abnormal.

46. The system according to claim 43, wherein the visual indicator is selected from the group consisting of: color, color intensity, size, shape, symbol, letter and number.

47. The system according to claim 43, wherein the tissue image comprises an image of liver tissue and the at least one of said object types comprises a hepatocyte and the parameter comprises fat content.

48. The system according to claim 47, wherein said parameter comprises a ratio of the area of fat contained in each hepatocyte, to the area of the respective hepatocyte.

49. The system according to claim 43, wherein said processor is configured to quantify micro-anatomic data corresponding to at least one of said object types.

50. The system according to claim 43, wherein said processor is configured to quantify molecular data corresponding to at least one of said object types.

51. The system according to claim 43, wherein said tissue image comprises an image of prostate tissue, said at least one of said object types comprises lumen, and said processor is configured to quantify lumen area relative to tissue area.

52. The system according to claim 43, wherein said tissue image comprises an image of prostate tissue, said at least one of said object types comprises a gland unit, and said processor is configured to determine a Gleason grade corresponding to said gland unit.

53. The system according to claim 43, wherein said processor is configured to quantify a size corresponding to at least one of said object types.

54. The system according to claim 43, wherein said processor is configured to quantify a shape corresponding to at least one of said object types.

55. The system according to claim 43, wherein said processor is configured to quantify a color corresponding to at least one of said object types.

56. The system according to claim 43, wherein said processor is configured to quantify a color intensity corresponding to at least one of said object types.

57. The system according to claim 43, wherein said processor is configured to quantify an area corresponding to at least one of said object types.

58. The system according to claim 43, wherein said processor is configured to determine a quantity corresponding to at least one of said object types.

59. The system according to claim 43, wherein said processor is configured to quantify at least one parameter corresponding to at least one of said object types relative to a granularity unit of the tissue image.

60. The system according to claim 59, wherein said granularity unit comprises a cell and said at least one of said object types comprises a cell component.

61. The system according to claim 43, wherein said processor is configured to classify the plurality of objects into a plurality of object types.

62. The system according to claim 43, wherein said one or more object types comprises at least one tissue object.

63. The system according to claim 62, wherein said at least one tissue object comprises a bile duct.

64. The system according to claim 62, wherein said at least one tissue object comprises a vein.

65. The system according to claim 62, wherein said at least one tissue object comprises an artery.

66. The system according to claim 62, wherein said at least one tissue object comprises a gland.

67. The system according to claim 43, wherein said one or more object types comprises at least one histopathological object.

68. The system according to claim 43, wherein said one or more object types comprises at least one cell component.

69. The system according to claim 68, wherein said at least one cell component comprises nuclei.

70. The system according to claim 68, wherein said at least one cell component comprises cytoplasm.

71. The system according to claim 68, wherein said at least one cell component comprises a vacuole.

72. The system according to claim 68, wherein said at least one cell component comprises fat.

73. The system according to claim 43, wherein said processor is configured to:
designate a first object type as a seed; and
implement region growing based on said seed to form a second object type.

74. The system according to claim 43, wherein said processor is configured to replace pixels of said object with pixels of a color of the bin corresponding to the respective object.

75. The system according to claim 43, wherein said processor is further configured to preprocess the tissue image to correct color variation.

76. The system according to claim 43, wherein said processor is further configured to apply a filter to enhance at least one object type of said one or more object types.

77. The system according to claim 43, wherein said processor is further configured to apply a filter to suppress at least one object type of said one or more object types.

* * * * *